(12) United States Patent
Kim et al.

(10) Patent No.: US 11,453,346 B2
(45) Date of Patent: Sep. 27, 2022

(54) DISPLAY DEVICE FOR A VEHICLE AND METHOD FOR CONTROLLING THE SAME

(71) Applicant: LG Electronics Inc., Seoul (KR)

(72) Inventors: Ilwan Kim, Seoul (KR); Jongtae Park, Seoul (KR); Jaeho Lee, Seoul (KR); Byeongjun Choi, Seoul (KR); Jinhyuk Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/031,277

(22) Filed: Sep. 24, 2020

(65) Prior Publication Data

US 2021/0129766 A1 May 6, 2021

Related U.S. Application Data

(60) Provisional application No. 62/931,739, filed on Nov. 6, 2019.

(51) Int. Cl.
*B60R 11/02* (2006.01)

(52) U.S. Cl.
CPC ..... *B60R 11/0229* (2013.01); *B60R 2300/205* (2013.01); *B60R 2300/308* (2013.01); *B60R 2300/804* (2013.01); *B60R 2300/8086* (2013.01)

(58) Field of Classification Search
None
See application file for complete search history.

(56) References Cited

U.S. PATENT DOCUMENTS

| 10,488,215 | B1* | 11/2019 | Yu | G06T 19/006 |
|---|---|---|---|---|
| 2014/0236473 | A1 | 8/2014 | Kondo et al. | |
| 2015/0266422 | A1* | 9/2015 | Chundrlik, Jr. | G06K 9/00798 348/148 |
| 2016/0328619 | A1* | 11/2016 | Yi | G06T 7/194 |
| 2016/0368505 | A1* | 12/2016 | Sorstedt | B60W 30/12 |
| 2017/0025017 | A1* | 1/2017 | Thomas | B60W 30/08 |
| 2017/0039438 | A1* | 2/2017 | Homma | B60R 1/00 |

(Continued)

FOREIGN PATENT DOCUMENTS

| JP | 2003307429 | 10/2003 |
|---|---|---|
| JP | 2015004612 | 1/2015 |

(Continued)

OTHER PUBLICATIONS

PCT International Search Report in International Application No. PCT/KR2020/007753, dated Sep. 25, 2020, 24 pages (with English translation).

(Continued)

*Primary Examiner* — Rebecca A Volentine
(74) *Attorney, Agent, or Firm* — Fish & Richardson P.C.

(57) ABSTRACT

A displace device for a vehicle includes a display unit and a controller. The controller is configured to: receive an image of a road in which the vehicle is located and trajectory information providing a trajectory of vehicle movement, detect one or more lanes of the road based on the received image of the road, assign weights to (i) the detected one or more lanes and (ii) the trajectory of vehicle movement, respectively, based on a preset reference value, generate a virtual road image providing a direction based on the assigned weights, and control the display unit to display the generated virtual road image.

14 Claims, 24 Drawing Sheets

(56) References Cited

U.S. PATENT DOCUMENTS

| | | | |
|---|---|---|---|
| 2018/0031384 A1* | 2/2018 | Lee | G01C 21/3602 |
| 2018/0058873 A1 | 3/2018 | Huang | |
| 2018/0283892 A1* | 10/2018 | Behrendt | G06F 16/29 |
| 2020/0309555 A1* | 10/2020 | Kumon | B60K 35/00 |
| 2020/0400455 A1* | 12/2020 | Wakayanagi | G08G 1/16 |
| 2021/0078503 A1* | 3/2021 | Horihata | B60K 35/00 |
| 2021/0081682 A1* | 3/2021 | Kumano | G09B 29/10 |
| 2021/0104212 A1* | 4/2021 | Horihata | G01C 21/3626 |

FOREIGN PATENT DOCUMENTS

| | | | |
|---|---|---|---|
| JP | 2015004612 A | * | 1/2015 |
| JP | 2016057750 | | 4/2016 |
| KR | 1020090052903 | | 5/2009 |
| KR | 101047719 | | 7/2011 |
| KR | 1020130136815 | | 12/2013 |
| KR | 1020150054022 | | 5/2015 |
| KR | 1020170101758 | | 9/2017 |

OTHER PUBLICATIONS

PCT International Search Report in International Application No. PCT/KR2020/008493, dated Oct. 15, 2020, 22 pages (with English translation).

\* cited by examiner

FIG. 11

| Number of recognized lane(s) | ADAS lane weight | Vehicle trajectory weight |
|---|---|---|
| 0 | 0% | 100% |
| 1 | 50% | 50% |
| 2 | 80% | 20% |

FIG. 15

| Number of of recognized lane(s) | Lane length | ADAS lane weight | Vehicle trajectory weight |
|---|---|---|---|
| 0 | - | 100% | 100% |
| 1 | Short | 30% | 70% |
| | Middle | 40% | 60% |
| | Long | 50% | 50% |
| 2 | Short | 60% | 40% |
| | Middle | 80% | 20% |
| | Long | 100% | 0% |

FIG. 16

| Condition | Number of recognized lane(s) (right/left) | Lane quality | Duration | ADAS lane Weight | Vehicle trajectory weight |
|---|---|---|---|---|---|
| 1 | 1 lane or more | High or above | 3 seconds or more | 100% | 0% |
| 2 | If condition #1 is not met | | | 0% | 100% |

DISPLAY DEVICE FOR A VEHICLE AND METHOD FOR CONTROLLING THE SAME

CROSS-REFERENCE TO RELATED APPLICATION

Pursuant to 35 U.S.C. § 119(a), this application claims the benefit of earlier filing date and right of priority to U.S. Provisional Application No. 62/931,739, filed on Nov. 6, 2019, the contents of which are hereby incorporated by reference herein in their entirety.

BACKGROUND

Field of the Disclosure

The present disclosure relates to a vehicle, and more particularly, to a display device for a vehicle providing information related to a currently driven vehicle and method for controlling the same.

Discussion of the Related Art

A vehicle is a device that moves in the direction desired by an occupant. A typical example of the vehicle is a car.

Meanwhile, for the convenience of users using vehicles, various sensors and electronic devices tend to be installed in the vehicles. In particular, many ongoing efforts are actively made to develop and research Advanced Driver Assistance System (ADAS) for the convenience of user's driving.

Particularly, the ADAS provides a lane departure warning function of recognizing lanes of a road on which a vehicle is running and then warning deviation of the vehicle from the recognized lanes, a lane maintaining function of maintaining the vehicle to be driven within the recognized lanes, and a driving road display function of displaying visual effects on the recognized lanes to make it easier for a driver to visually identify the road on which the vehicle is running.

However, in case of the driving road display function, although the ADAS displays an image that represents a driving road based on a lane border of the driving road on which a vehicle is running, errors may be generated from the lane border recognized by the ADAS and there is also a problem that the ADAS fails to recognize all lanes continuously.

SUMMARY

Accordingly, embodiments of the present disclosure are directed to a display device for a vehicle and method for controlling the same that substantially obviate one or more problems due to limitations and disadvantages of the related art.

One object of the present disclosure is to provide a display device for a vehicle and method for controlling the same, by which a virtual driving road image is displayed on a driving road of a vehicle based on the driving road of the vehicle and trajectory information attributed to a driving motion of the vehicle.

Technical tasks obtainable from the present disclosure are non-limited by the above-mentioned technical tasks. And, other unmentioned technical tasks can be clearly understood from the following description by those having ordinary skill in the technical field to which the present disclosure pertains.

Additional advantages, objects, and features of the disclosure will beset forth in the disclosure herein as well as the accompanying drawings. Such aspects may also be appreciated by those skilled in the art based on the disclosure herein.

To achieve these objects and other advantages and in accordance with the purpose of the disclosure, as embodied and broadly described herein, a display device for a vehicle according to one embodiment of the present disclosure may include a display unit and a controller configured to receive an image of a driving road of the vehicle and trajectory information attributed to a driving motion of the vehicle, detect a lane of the driving road of the vehicle from the received road image, give weights to the detected line and a trajectory of the vehicle based on a preset reference value, respectively, generate a virtual road image indicating the driving road of the vehicle based on a result from giving the weights, and control the display unit to display the generated virtual road image.

In another aspect of the present disclosure, as embodied and broadly described herein, a method of controlling a display device for a vehicle according to another embodiment of the present disclosure may include receiving an image of a driving road of the vehicle and trajectory information attributed to a driving motion of the vehicle, detecting a lane of the driving road of the vehicle from the received road image, giving weights to the detected line and a trajectory of the vehicle based on a preset reference value, respectively, generating a virtual road image indicating the driving road of the vehicle based on a result from giving the weights, and displaying the generated virtual road image.

Accordingly, embodiments of the present disclosure provide various effects and/or features.

According to at least one of various embodiments of the present disclosure, a virtual driving road image is displayed on a driving road of a vehicle based on trajectory information attributed to the driving road of the vehicle and a driving motion of the vehicle, thereby providing a driver with accurate information on the driving road of the vehicle.

Effects obtainable from the present disclosure may be non-limited by the above-mentioned effect. And, other unmentioned effects can be clearly understood from the following description by those having ordinary skill in the technical field to which the present disclosure pertains.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. The above and other aspects, features, and advantages of the present disclosure will become more apparent upon consideration of the following description of preferred embodiments, taken in conjunction with the accompanying drawing figures. In the drawings:

FIGS. 11 to 16 are diagrams to describe a process for generating an AR carpet by giving weights to a detected lane and a vehicle trajectory according to the present disclosure;

DETAILED DESCRIPTION OF THE DISCLOSURE

Figure 1:
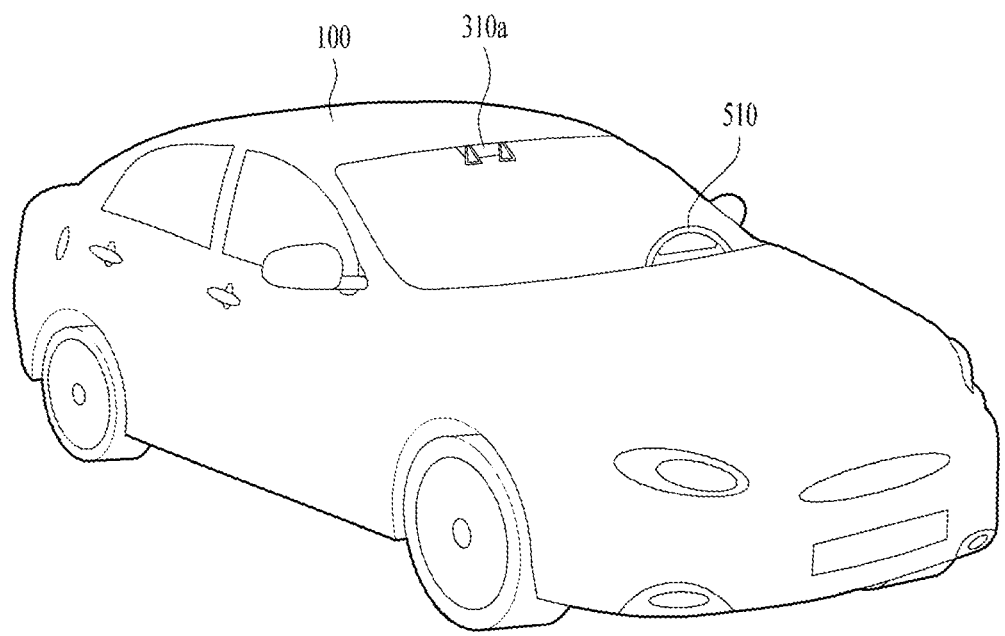
FIG. 1 is a view illustrating the external appearance of a vehicle according to an embodiment of the present disclosure.
Figure 1:
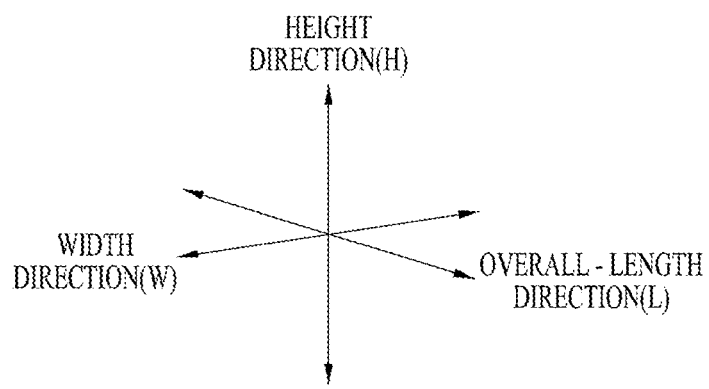

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, the suffixes "module" and "unit" are used or combined with each other only in consideration of ease in the preparation of the specification, and do not have or serve as different meanings. Accordingly, the suffixes "module" and "unit" may be interchanged with each other. In addition, in the following description of the embodiments disclosed in the present specification, a detailed description of known functions and configurations incorporated herein will be omitted when it may make the subject matter of the embodiments disclosed in the present specification rather unclear. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents and substitutions included in the scope and sprit of the present disclosure. It will be understood that although the terms "first," "second," etc., may be used herein to describe various components, these components should not be limited by these terms. These terms are only used to distinguish one component from another component.

It will be understood that when a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless the context clearly indicates otherwise.

In the present application, it will be further understood that the terms "comprises", includes," etc. specify the presence of stated features, integers, steps, operations, elements, components, or combinations thereof, but do not preclude the presence or addition of one or more other features, integers, steps, operations, elements, components, or combinations thereof.

A vehicle as described in this specification may include an automobile and a motorcycle. Hereinafter, a description will be given based on an automobile.

A vehicle as described in this specification may include all of an internal combustion engine vehicle including an engine as a power source, a hybrid vehicle including both an engine and an electric motor as a power source, and an electric vehicle including an electric motor as a power source.

In the following description, "the left side of the vehicle" refers to the left side in the forward driving direction of the vehicle, and "the right side of the vehicle" refers to the right side in the forward driving direction of the vehicle.

FIG. 1 is a view of the external appearance of a vehicle according to an embodiment of the present disclosure.

Figure 2:
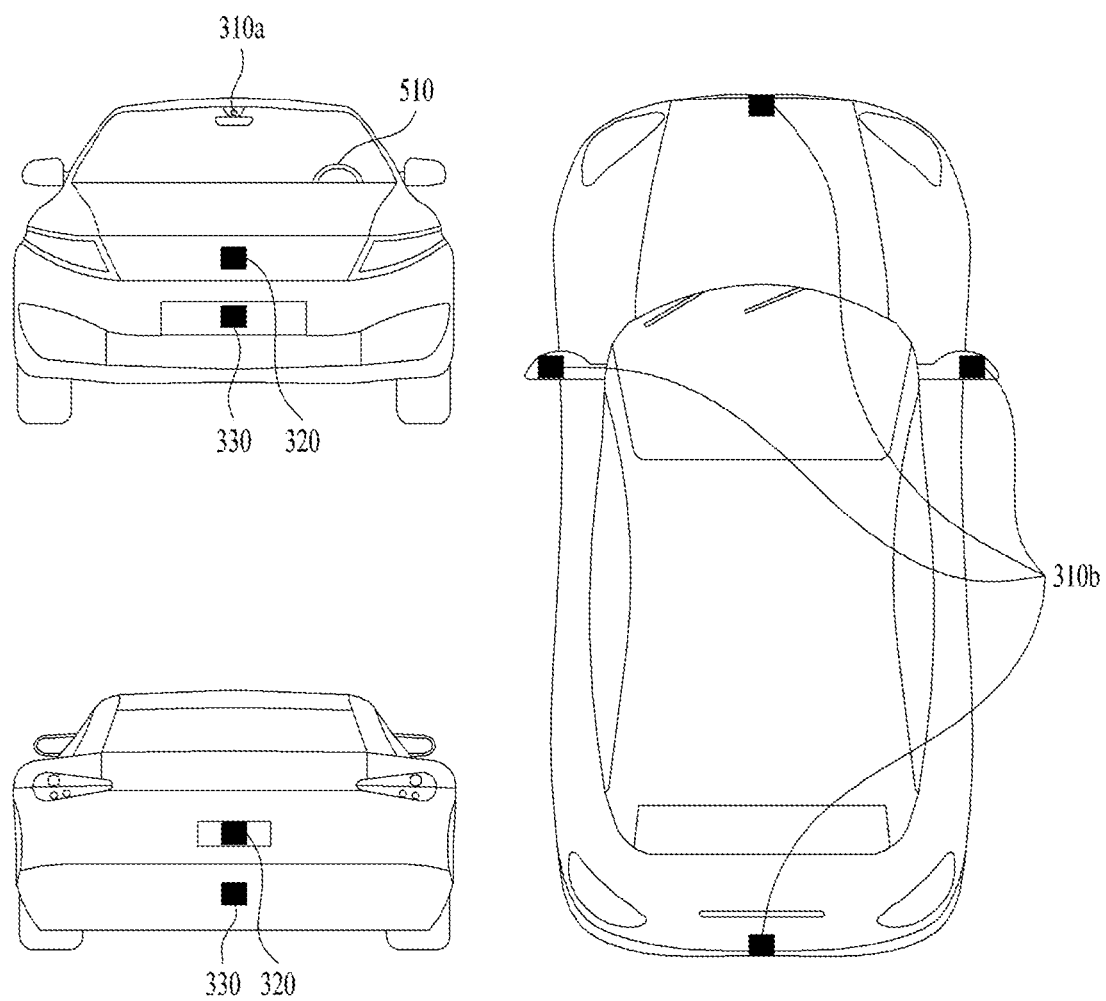
FIG. 2 are different angled views of the external appearance of a vehicle according to an embodiment of the present disclosure.

FIG. 2 is different angled views of a vehicle according to an embodiment of the present disclosure.

Figure 3:
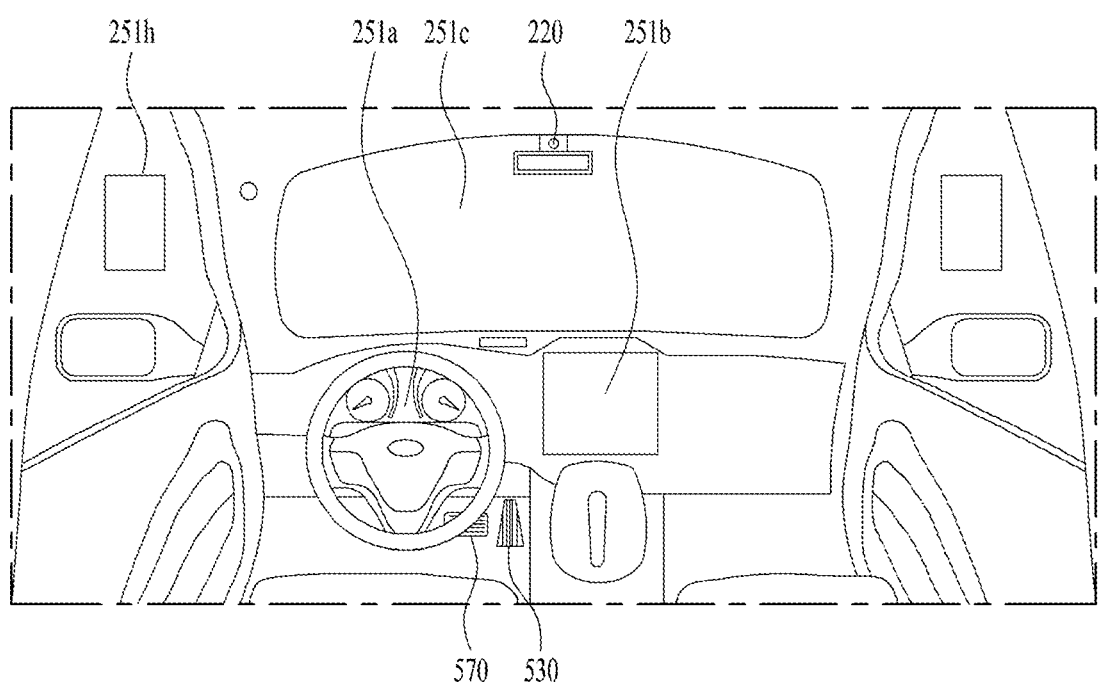
FIGS. 3 and 4 are views illustrating the interior configuration of a vehicle according to an embodiment of the present disclosure.
Figure 4:
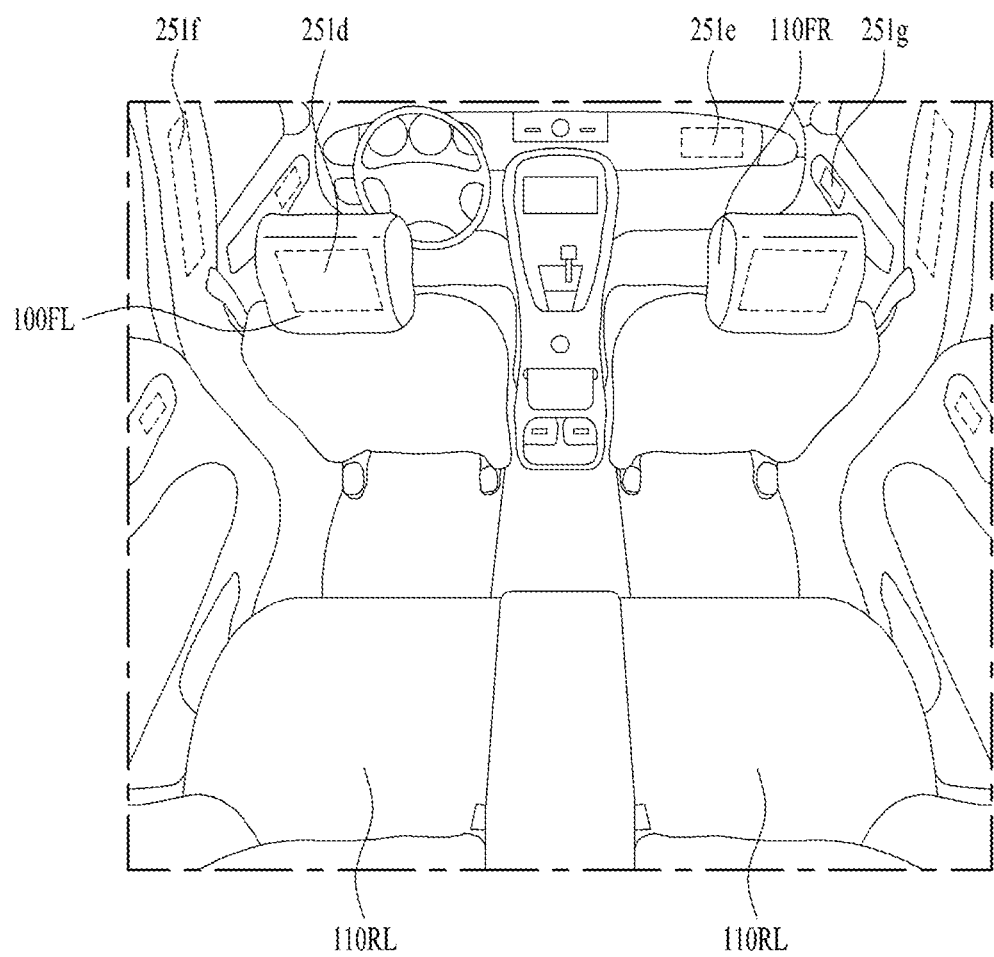

FIGS. 3 and 4 are views of the internal configuration of a vehicle according to an embodiment of the present disclosure.

Figure 5:
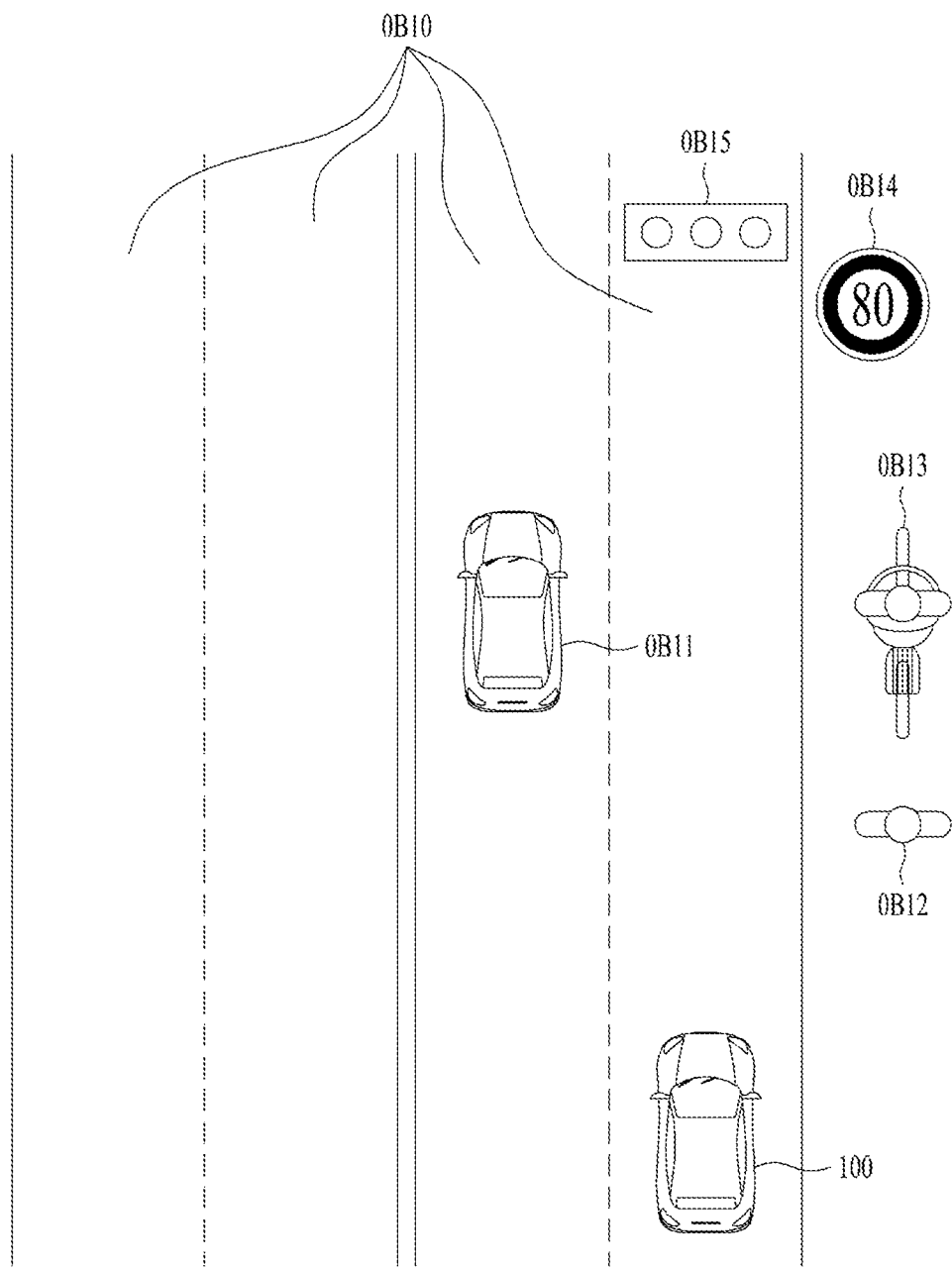
FIGS. 5 and 6 are views illustrating an object according to an embodiment of the present disclosure.
Figure 6:
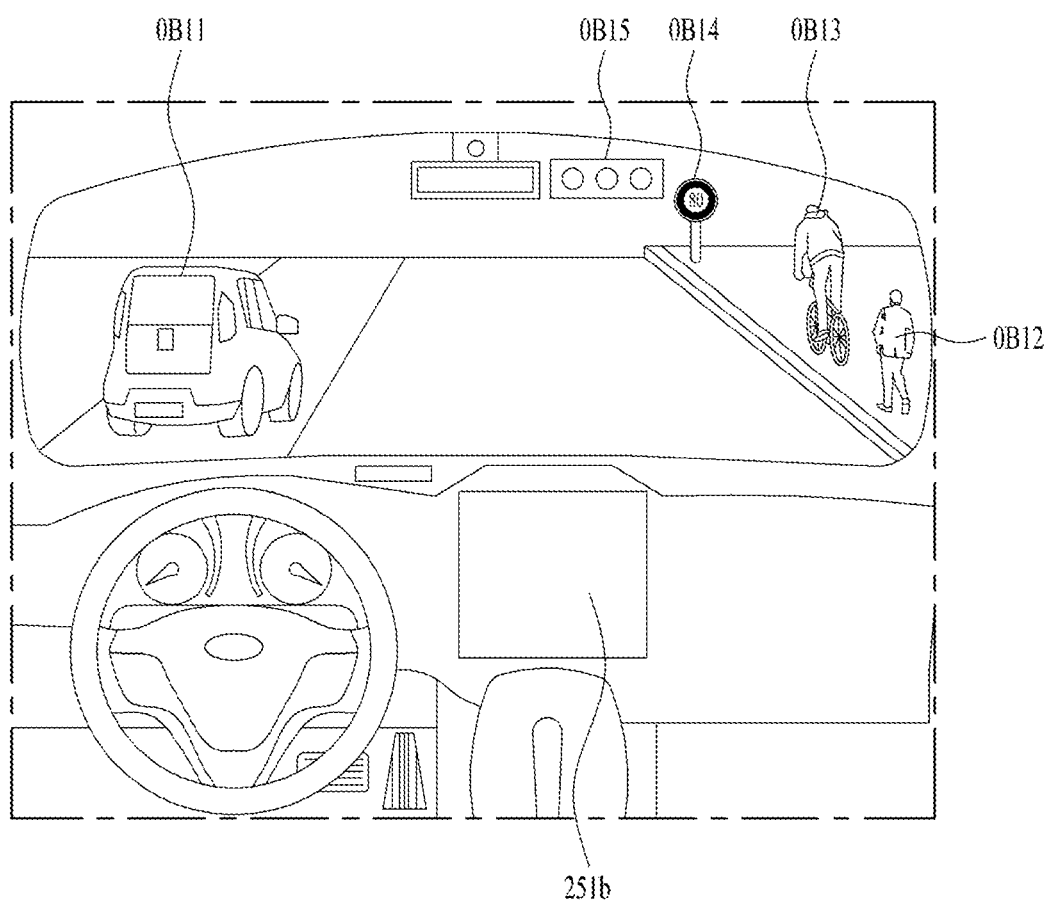

FIGS. 5 and 6 are views for explanation of objects according to an embodiment of the present disclosure.

Figure 7:
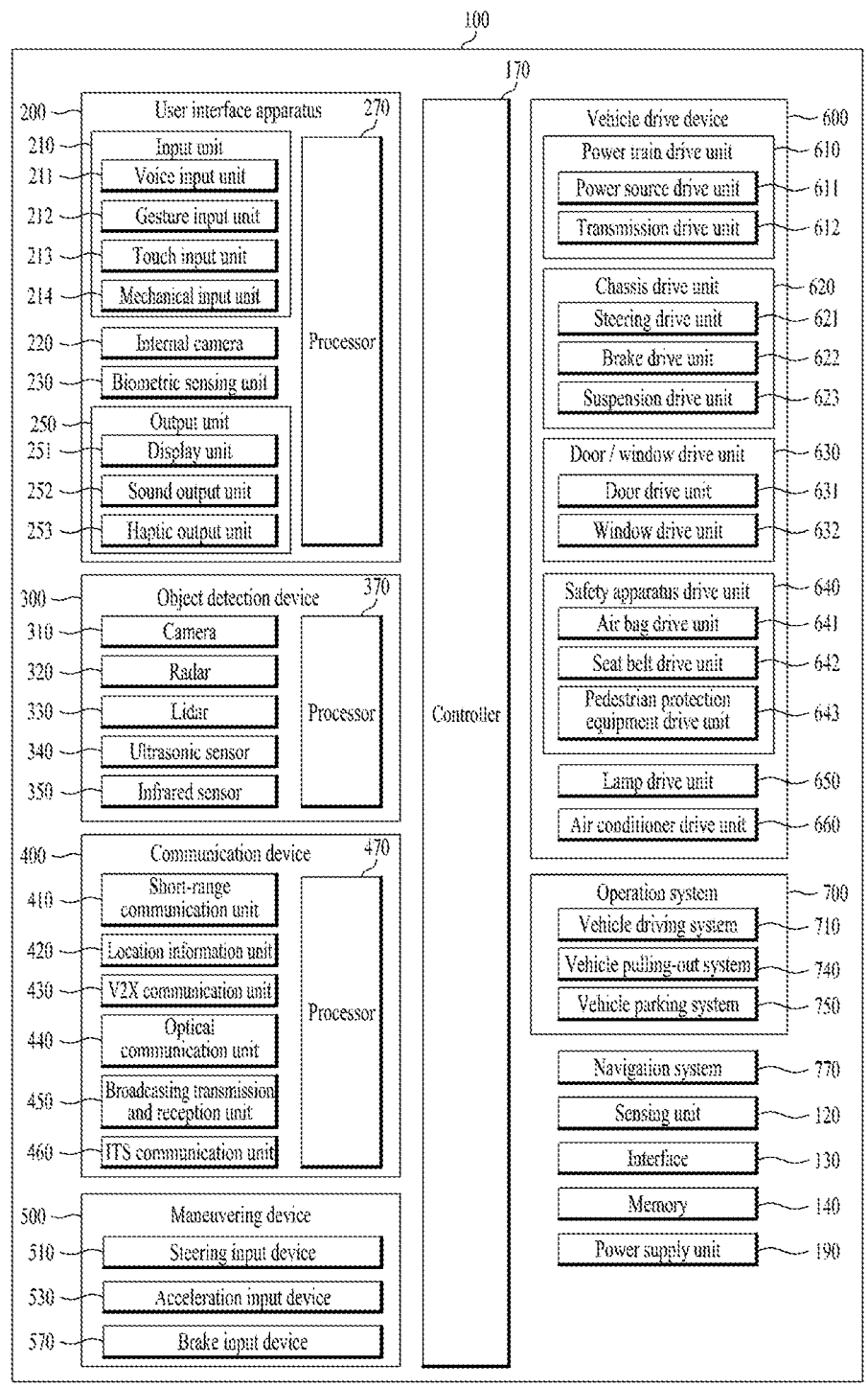
FIG. 7 is a block diagram illustrating a vehicle according to an embodiment of the present disclosure.

FIG. 7 is a block diagram illustrating a vehicle according to an embodiment of the present disclosure.

Referring to FIGS. 1 to 7, a vehicle 100 may include a plurality of wheels, which are rotated by a power source, and a steering input device 510 for controlling a driving direction of the vehicle 100.

The vehicle 100 may be an autonomous vehicle.

The vehicle 100 may be switched to an autonomous mode or a manual mode in response to a user input.

For example, in response to a user input received through a user interface device 200, the vehicle 100 may be switched from a manual mode to an autonomous mode, or vice versa.

The vehicle 100 may be switched to the autonomous mode or to the manual mode based on driving environment information.

The driving environment information may include at least one of the following: information on an object outside a vehicle, navigation information, and vehicle state information.

For example, the vehicle 100 may be switched from the manual mode to the autonomous mode, or vice versa, based on driving environment information generated by the object detection device 300.

In another example, the vehicle 100 may be switched from the manual mode to the autonomous mode, or vice versa, based on driving environment information received through a communication device 400.

The vehicle 100 may be switched from the manual mode to the autonomous mode, or vice versa, based on information, data, and a signal provided from an external device.

When the vehicle 100 operates in the autonomous mode, the autonomous vehicle 100 may operate based on an operation system 700.

For example, the autonomous vehicle 100 may operate based on information, data, or signals generated by a driving system 710, a vehicle pulling-out system 740, and a vehicle parking system 750.

While operating in the manual mode, the autonomous vehicle 100 may receive a user input for driving of the vehicle 100 through a maneuvering device 500. In response to the user input received through the maneuvering device 500, the vehicle 100 may operate.

The term "overall length" means the length from the front end to the rear end of the vehicle 100, the term "overall width" means the width of the vehicle 100, and the term "overall height" means the height from the bottom of the wheel to the roof. In the following description, the term "overall length direction L" may mean the reference direction for the measurement of the overall length of the vehicle 100, the term "overall width direction W" may mean the reference direction for the measurement of the overall width of the vehicle 100, and the term "overall height direction H" may mean the reference direction for the measurement of the overall height of the vehicle 100.

As illustrated in FIG. 7, the vehicle 100 may include the user interface device 200, the object detection device 300, the communication device 400, the maneuvering device 500, a vehicle drive device 600, the operation system 700, a navigation system 770, a sensing unit 120, an interface 130, a memory 140, a controller 170, and a power supply unit 190.

In some embodiments, the vehicle 100 may further include other components in addition to the aforementioned components, or may not include some of the aforementioned components. The sensing unit 120 may sense the state of the vehicle. The sensing unit 120 may include an attitude sensor (for example, a yaw sensor, a roll sensor, or a pitch sensor), a collision sensor, a wheel sensor, a speed sensor, a gradient sensor, a weight sensor, a heading sensor, a gyro sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, an ultrasonic sensor, an illumination sensor, an accelerator pedal position sensor, and a brake pedal position sensor.

The sensing unit 120 may acquire sensing signals with regard to, for example, vehicle attitude information, vehicle collision information, vehicle driving direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering-wheel rotation angle information, outside illumination information, information about the pressure applied to an accelerator pedal, and information about the pressure applied to a brake pedal.

The sensing unit 120 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 120 may generate vehicle state information based on sensing data. The vehicle condition information may be information that is generated based on data sensed by a variety of sensors inside a vehicle.

For example, the vehicle state information may include vehicle position information, vehicle speed information, vehicle tilt information, vehicle weight information, vehicle direction information, vehicle battery information, vehicle fuel information, vehicle tire pressure information, vehicle steering information, in-vehicle temperature information, in-vehicle humidity information, pedal position information, vehicle engine temperature information, etc.

The interface 130 may serve as a passage for various kinds of external devices that are connected to the vehicle 100. For example, the interface 130 may have a port that is connectable to a mobile terminal and may be connected to the mobile terminal via the port. In this case, the interface 130 may exchange data with the mobile terminal.

Meanwhile, the interface 130 may serve as a passage for the supply of electrical energy to a mobile terminal connected thereto. When the mobile terminal is electrically connected to the interface 130, the interface 130 may provide electrical energy, supplied from the power supply unit 190, to the mobile terminal under control of the controller 170.

The memory 140 is electrically connected to the controller 170. The memory 140 may store basic data for each unit, control data for the operational control of each unit, and input/output data. The memory 140 may be any of various hardware storage devices, such as a ROM, a RAM, an EPROM, a flash drive, and a hard drive. The memory 140 may store various data for the overall operation of the vehicle 100, such as programs for the processing or control of the controller 170.

In some embodiments, the memory 140 may be integrally formed with the controller 170, or may be provided as an element of the controller 170.

The controller 170 may control the overall operation of each unit inside the vehicle 100. The controller 170 may be referred to as an Electronic Controller (ECU).

The power supply unit 190 may supply power required to operate each component under control of the controller 170. In particular, the power supply unit 190 may receive power from, for example, a battery inside the vehicle 100.

At least one processor and the controller 170 included in the vehicle 100 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

Further, each of the sensing unit 120, the interface unit 130, the memory 140, the power supply unit 190, the user interface device 200, the object detection device 300, the communication device 400, the maneuvering device 500, the vehicle drive device 600, the operation system 700, and the navigation system 770 may have an individual processor or may be incorporated in the controller 170.

The user interface device 200 is provided to support communication between the vehicle 100 and a user. The user interface device 200 may receive a user input, and provide information generated in the vehicle 100 to the user. The vehicle 100 may enable User Interfaces (UI) or User Experience (UX) through the user interface device 200.

The user interface device 200 may include an input unit 210, an internal camera 220, a biometric sensing unit 230, an output unit 250, and a processor 270. Each component of the user interface device 200 may be separated from or integrated with the afore-described interface 130, structurally or operatively.

In some embodiments, the user interface device 200 may further include other components in addition to the aforementioned components, or may not include some of the aforementioned components.

The input unit 210 is configured to receive information from a user, and data collected in the input unit 210 may be analyzed by the processor 270 and then processed into a control command of the user.

The input unit 210 may be disposed inside the vehicle 100. For example, the input unit 210 may be disposed in a region of a steering wheel, a region of an instrument panel, a region of a seat, a region of each pillar, a region of a door, a region of a center console, a region of a head lining, a region of a sun visor, a region of a windshield, or a region of a window.

The input unit 210 may include a voice input unit 211, a gesture input unit 212, a touch input unit 213, and a mechanical input unit 214.

The voice input unit 211 may convert a voice input of a user into an electrical signal. The converted electrical signal may be provided to the processor 270 or the controller 170.

The voice input unit 211 may include one or more microphones.

The gesture input unit 212 may convert a gesture input of a user into an electrical signal. The converted electrical signal may be provided to the processor 270 or the controller 170.

The gesture input unit 212 may include at least one selected from among an infrared sensor and an image sensor for sensing a gesture input of a user.

In some embodiments, the gesture input unit 212 may sense a three-dimensional (3D) gesture input of a user. To this end, the gesture input unit 212 may include a plurality of light emitting units for outputting infrared light, or a plurality of image sensors.

The gesture input unit 212 may sense the 3D gesture input by employing a time of flight (TOF) scheme, a structured light scheme, or a disparity scheme.

The touch input unit 213 may convert a user's touch input into an electrical signal. The converted electrical signal may be provided to the processor 270 or the controller 170.

The touch input unit 213 may include a touch sensor for sensing a touch input of a user.

In some embodiments, the touch input unit 210 may be formed integral with a display unit 251 to implement a touch screen. The touch screen may provide an input interface and an output interface between the vehicle 100 and the user.

The mechanical input unit 214 may include at least one selected from among a button, a dome switch, a jog wheel, and a jog switch. An electrical signal generated by the mechanical input unit 214 may be provided to the processor 270 or the controller 170.

The mechanical input unit 214 may be located on a steering wheel, a center fascia, a center console, a cockpit module, a door, etc.

The processor 270 may start a learning mode of the vehicle 100 in response to a user input to at least one of the afore-described voice input unit 211, gesture input unit 212, touch input unit 213, or mechanical input unit 214. In the learning mode, the vehicle 100 may learn a driving route and ambient environment of the vehicle 100. The learning mode will be described later in detail in relation to the object detection device 300 and the operation system 700.

The internal camera 220 may acquire images of the inside of the vehicle 100. The processor 270 may sense a user's condition based on the images of the inside of the vehicle 100. The processor 270 may acquire information on an eye gaze of the user. The processor 270 may sense a gesture of the user from the images of the inside of the vehicle 100.

The biometric sensing unit 230 may acquire biometric information of the user. The biometric sensing unit 230 may include a sensor for acquire biometric information of the user, and may utilize the sensor to acquire finger print information, heart rate information, etc. of the user. The biometric information may be used for user authentication.

The output unit 250 is configured to generate a visual, audio, or tactile output.

The output unit 250 may include at least one selected from among a display unit 251, a sound output unit 252, and a haptic output unit 253.

The display unit 251 may display graphic objects corresponding to various types of information.

The display unit 251 may include at least one selected from among a Liquid Crystal Display (LCD), a Thin Film Transistor-Liquid Crystal Display (TFT LCD), an Organic Light-Emitting Diode (OLED), a flexible display, a 3D display, and an e-ink display.

The display unit 251 may form an inter-layer structure together with the touch input unit 213, or may be integrally formed with the touch input unit 213 to implement a touch screen.

The display unit 251 may be implemented as a head up display (HUD). When implemented as a HUD, the display unit 251 may include a projector module in order to output information through an image projected on a windshield or a window.

The display unit 251 may include a transparent display. The transparent display may be attached on the windshield or the window.

The transparent display may display a predetermined screen with a predetermined transparency. In order to achieve the transparency, the transparent display may include at least one selected from among a transparent Thin Film Electroluminescent (TFEL) display, an Organic Light Emitting Diode (OLED) display, a transparent Liquid Crystal Display (LCD), a transmissive transparent display, and a transparent Light Emitting Diode (LED) display. The transparency of the transparent display may be adjustable.

Meanwhile, the user interface device 200 may include a plurality of display units 251a to 251g.

The display unit 251 may be disposed in a region of a steering wheel, a region 251a, 251b or 251e of an instrument panel, a region 251d of a seat, a region 251f of each pillar, a region 251g of a door, a region of a center console, a region of a head lining, a region of a sun visor, a region 251c of a windshield, or a region 251h of a window.

The sound output unit 252 converts an electrical signal from the processor 270 or the controller 170 into an audio signal, and outputs the audio signal. To this end, the sound output unit 252 may include one or more speakers.

The haptic output unit 253 generates a tactile output. For example, the haptic output unit 253 may operate to vibrate a steering wheel, a safety belt, and seats 110FL, 110FR, 110RL, and 110RR so as to allow a user to recognize the output.

The processor 270 may control the overall operation of each unit of the user interface device 200.

In some embodiments, the user interface device 200 may include a plurality of processors 270 or may not include the processor 270.

In a case where the user interface device 200 does not include the processor 270, the user interface device 200 may operate under control of the controller 170 or a processor of a different device inside the vehicle 100.

Meanwhile, the user interface device 200 may be referred to as a display device for a vehicle.

The user interface device 200 may operate under control of the controller 170.

The object detection device 300 is used to detect an object outside the vehicle 100. The object detection device 300 may generate object information based on sensing data.

The object information may include information about the presence of an object, location information of the object, information on distance between the vehicle and the object, and the speed of the object relative to the vehicle 100.

The object may include various objects related to travelling of the vehicle 100.

Referring to FIGS. 5 and 6, an object o may include a lane OB10, a nearby vehicle OB11, a pedestrian OB12, a two-wheeled vehicle OB13, a traffic signal OB14 and OB15, a light, a road, a structure, a bump, a geographical feature, an animal, etc.

The lane OB10 may be a lane in which the vehicle 100 is traveling (hereinafter, referred to as the current driving lane), a lane next to the current driving lane, and a lane in which a vehicle travelling in the opposite direction is travelling. The lane OB10 may include left and right lines that define the lane.

The nearby vehicle OB11 may be a vehicle that is travelling in the vicinity of the vehicle 100. The nearby vehicle OB11 may be a vehicle within a predetermined distance from the vehicle 100. For example, the nearby vehicle OB11 may be a vehicle that is preceding or following the vehicle 100.

The pedestrian OB12 may be a person in the vicinity of the vehicle 100. The pedestrian OB12 may be a person within a predetermined distance from the vehicle 100. For example, the pedestrian OB12 may be a person on a sidewalk or on the roadway.

The two-wheeled vehicle OB13 is a vehicle that is located in the vicinity of the vehicle 100 and moves with two wheels. The two-wheeled vehicle OB13 may be a vehicle that has two wheels within a predetermined distance from the vehicle 100. For example, the two-wheeled vehicle OB13 may be a motorcycle or a bike on a sidewalk or the roadway.

The traffic signal may include a traffic light OB15, a traffic sign plate OB14, and a pattern or text painted on a road surface.

The light may be light generated by a lamp provided in the nearby vehicle. The light may be light generated by a street light. The light may be solar light.

The road may include a road surface, a curve, and slopes, such as an upward slope and a downward slope.

The structure may be a body located around the road in the state of being fixed onto the ground. For example, the structure may include a streetlight, a roadside tree, a building, a traffic light, and a bridge.

The geographical feature may include a mountain and a hill.

Meanwhile, the object may be classified as a movable objector a stationary object. For example, the movable object may include a nearby vehicle and a pedestrian. For example, the stationary object may include a traffic signal, a road, and a structure.

The object detection device 300 may include a camera 310, a radar 320, a lidar 330, an ultrasonic sensor 340, an infrared sensor 350, and a processor 370. Each component of the object detection device may be separated from or integrated with the sensing unit, structurally or operatively.

In some embodiments, the object detection device 300 may further include other components in addition to the aforementioned components, or may not include some of the aforementioned components.

The camera 310 may be located at an appropriate position outside the vehicle 100 in order to acquire images of the outside of the vehicle 100. The camera 310 may be a mono camera, a stereo camera 310a, an around view monitoring (AVM) camera 310b, or a 360-degree camera.

Using various image processing algorithms, the camera 310 may acquire location information of an object, information on distance to the object, and information on speed relative to the object.

For example, based on change in size overtime of an object in acquired images, the camera 310 may acquire information on distance to the object and information on speed relative to the object.

For example, the camera 310 may acquire the information on distance to the object and the information on speed relative to the object by utilizing a pin hole model or by profiling a road surface.

For example, the camera 310 may acquire the information on distance to the object and the information on the speed relative to the object, based on information on disparity of stereo images acquired by a stereo camera 310a.

For example, the camera 310 may be disposed near a front windshield in the vehicle 100 in order to acquire images of the front of the vehicle 100. Alternatively, the camera 310 may be disposed around a front bumper or a radiator grill.

In another example, the camera 310 may be disposed near a rear glass in the vehicle 100 in order to acquire images of the rear of the vehicle 100. Alternatively, the camera 310 may be disposed around a rear bumper, a trunk, or a tailgate.

In yet another example, the camera 310 may be disposed near at least one of the side windows in the vehicle 100 in order to acquire images of the side of the vehicle 100. Alternatively, the camera 310 may be disposed around a side mirror, a fender, or a door.

The camera 310 may provide an acquired image to the processor 370.

The radar 320 may include an electromagnetic wave transmission unit and an electromagnetic wave reception unit. The radar 320 may be realized as a pulse radar or a continuous wave radar depending on the principle of emission of an electronic wave. In addition, the radar 320 may be realized as a Frequency Modulated Continuous Wave (FMCW) type radar or a Frequency Shift Keying (FSK) type radar depending on the waveform of a signal.

The radar 320 may detect an object through the medium of an electromagnetic wave by employing a time of flight (TOF) scheme or a phase-shift scheme, and may detect a location of the detected object, the distance to the detected object, and the speed relative to the detected object.

The radar 320 may be located at an appropriate position outside the vehicle 100 in order to sense an object located in front of the vehicle 100, an object located to the rear of the vehicle 100, or an object located to the side of the vehicle 100.

The lidar 330 may include a laser transmission unit and a laser reception unit. The lidar 330 may be implemented by the TOF scheme or the phase-shift scheme.

The lidar 330 may be implemented as a drive type lidar or a non-drive type lidar.

When implemented as the drive type lidar, the lidar 300 may rotate by a motor and detect an object in the vicinity of the vehicle 100.

When implemented as the non-drive type lidar, the lidar 300 may utilize a light steering technique to detect an object located within a predetermined distance from the vehicle 100.

The lidar 330 may detect an object through the medium of laser light by employing the TOF scheme or the phase-shift scheme, and may detect a location of the detected object, the distance to the detected object, and the speed relative to the detected object.

The lidar 330 may be located at an appropriate position outside the vehicle 100 in order to sense an object located in front of the vehicle 100, an object located to the rear of the vehicle 100, or an object located to the side of the vehicle 100.

The ultrasonic sensor 340 may include an ultrasonic wave transmission unit and an ultrasonic wave reception unit. The ultrasonic sensor 340 may detect an object based on an ultrasonic wave, and may detect a location of the detected object, the distance to the detected object, and the speed relative to the detected object.

The ultrasonic sensor 340 may be located at an appropriate position outside the vehicle 100 in order to detect an object located in front of the vehicle 100, an object located to the rear of the vehicle 100, and an object located to the side of the vehicle 100.

The infrared sensor 350 may include an infrared light transmission unit and an infrared light reception unit. The infrared sensor 350 may detect an object based on infrared light, and may detect a location of the detected object, the distance to the detected object, and the speed relative to the detected object.

The infrared sensor 350 may be located at an appropriate position outside the vehicle 100 in order to sense an object located in front of the vehicle 100, an object located to the rear of the vehicle 100, or an object located to the side of the vehicle 100.

The processor 370 may control the overall operation of each unit of the object detection device 300.

The processor 370 may detector classify an object by comparing data sensed by the camera 310, the radar 320, the lidar 330, the ultrasonic sensor 340, and the infrared sensor 350 with pre-stored data.

The processor 370 may detect and track an object based on acquired images. The processor 370 may, for example, calculate the distance to the object and the speed relative to the object.

For example, the processor 370 may acquire information on the distance to the object and information on the speed relative to the object based on a variation in size over time of the object in acquired images.

In another example, the processor 370 may acquire information on the distance to the object or information on the speed relative to the object by employing a pin hole model or by profiling a road surface.

In yet another example, the processor 370 may acquire information on the distance to the object and information on the speed relative to the object based on information on disparity of stereo images acquired from the stereo camera 310*a*.

The processor 370 may detect and track an object based on a reflection electromagnetic wave which is formed as a result of reflection a transmission electromagnetic wave by the object. Based on the electromagnetic wave, the processor 370 may, for example, calculate the distance to the object and the speed relative to the object.

The processor 370 may detect and track an object based on a reflection laser light which is formed as a result of reflection of transmission laser by the object. Based on the laser light, the processor 370 may, for example, calculate the distance to the object and the speed relative to the object.

The processor 370 may detect and track an object based on a reflection ultrasonic wave which is formed as a result of reflection of a transmission ultrasonic wave by the object. Based on the ultrasonic wave, the processor 370 may, for example, calculate the distance to the object and the speed relative to the object.

The processor 370 may detect and track an object based on reflection infrared light which is formed as a result of reflection of transmission infrared light by the object. Based on the infrared light, the processor 370 may, for example, calculate the distance to the object and the speed relative to the object.

As described before, once the vehicle 100 starts the learning mode in response to a user input to the input unit 210, the processor 370 may store data sensed by the camera 310, the radar 320, the lidar 330, the ultrasonic sensor 340, and the infrared sensor 350 in the memory 140.

Each step of the learning mode based on analysis of stored data, and an operating mode following the learning mode will be described later in detail in relation to the operation system 700. According to an embodiment, the object detection device 300 may include a plurality of processors 370 or no processor 370. For example, the camera 310, the radar 320, the lidar 330, the ultrasonic sensor 340, and the infrared sensor 350 may include individual processors.

Ina case where the object detection device 300 does not include the processor 370, the object detection device 300 may operate under control of the controller 170 or a processor inside the vehicle 100.

The object detection device 300 may operate under control of the controller 170.

The communication device 400 is configured to perform communication with an external device. Here, the external device may be a nearby vehicle, a mobile terminal, or a server.

To perform communication, the communication device 400 may include at least one selected from among a transmission antenna, a reception antenna, a Radio Frequency (RF) circuit capable of implementing various communication protocols, and an RF device.

The communication device 400 may include a short-range communication unit 410, a location information unit 420, a V2X communication unit 430, an optical communication unit 440, a broadcast transmission and reception unit 450, an Intelligent Transport Systems (ITS) communication unit 460, and a processor 470.

In some embodiments, the communication device 400 may further include other components in addition to the aforementioned components, or may not include some of the aforementioned components.

The short-range communication unit 410 is configured to perform short-range communication. The short-range communication unit 410 may support short-range communication using at least one selected from among Bluetooth™, Radio Frequency IDdentification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus).

The short-range communication unit 410 may form wireless area networks to perform short-range communication between the vehicle 100 and at least one external device.

The location information unit 420 is configured to acquire location information of the vehicle 100. For example, the location information unit 420 may include a Global Positioning System (GPS) module or a Differential Global Positioning System (DGPS) module.

The V2X communication unit 430 is configured to perform wireless communication between a vehicle and a server (that is, vehicle to infra (V2I) communication), wireless communication between a vehicle and a nearby vehicle (that is, vehicle to vehicle (V2V) communication), or wireless communication between a vehicle and a pedestrian (that is, vehicle to pedestrian (V2P) communication).

The optical communication unit 440 is configured to perform communication with an external device through the medium of light. The optical communication unit 440 may include a light emitting unit, which converts an electrical signal into an optical signal and transmits the optical signal to the outside, and a light receiving unit which converts a received optical signal into an electrical signal.

In some embodiments, the light emitting unit may be integrally formed with a lamp provided included in the vehicle 100.

The broadcast transmission and reception unit 450 is configured to receive a broadcast signal from an external broadcasting management server or transmit a broadcast signal to the broadcasting management server through a broadcasting channel. The broadcasting channel may include a satellite channel, and a terrestrial channel. The broadcast signal may include a TV broadcast signal, a radio broadcast signal, and a data broadcast signal.

The processor 470 may control the overall operation of each unit of the communication device 400.

In some embodiments, the communication device 400 may include a plurality of processors 470, or may not include the processor 470.

In a case where the communication device 400 does not include the processor 470, the communication device 400 may operate under control of the controller 170 or a processor of a device inside of the vehicle 100.

Meanwhile, the communication device 400 may implement a vehicle display device, together with the user interface device 200. In this case, the vehicle display device may be referred to as a telematics device or an audio video navigation (AVN) device.

The communication device 400 may operate under control of the controller 170.

The maneuvering device 500 is configured to receive a user input for driving the vehicle 100.

In the manual mode, the vehicle 100 may operate based on a signal provided by the maneuvering device 500.

The maneuvering device 500 may include a steering input device 510, an acceleration input device 530, and a brake input device 570.

The steering input device 510 may receive a user input with regard to the direction of travel of the vehicle 100. The steering input device 510 may take the form of a wheel to enable a steering input through the rotation thereof. In some embodiments, the steering input device may be provided as a touchscreen, a touch pad, or a button.

The acceleration input device 530 may receive a user input for acceleration of the vehicle 100. The brake input device 570 may receive a user input for deceleration of the vehicle 100. Each of the acceleration input device 530 and the brake input device 570 may take the form of a pedal. In some embodiments, the acceleration input device or the break input device may be configured as a touch screen, a touch pad, or a button.

The maneuvering device 500 may operate under control of the controller 170.

The vehicle drive device 600 is configured to electrically control the operation of various devices of the vehicle 100.

The vehicle drive device 600 may include a power train drive unit 610, a chassis drive unit 620, a door/window drive unit 630, a safety apparatus drive unit 640, a lamp drive unit 650, and an air conditioner drive unit 660.

In some embodiments, the vehicle drive device 600 may further include other components in addition to the aforementioned components, or may not include some of the aforementioned components.

Meanwhile, the vehicle drive device 600 may include a processor. Each unit of the vehicle drive device 600 may include its own processor.

The power train drive unit 610 may control the operation of a power train.

The power train drive unit 610 may include a power source drive unit 611 and a transmission drive unit 612.

The power source drive unit 611 may control a power source of the vehicle 100.

In the case in which a fossil fuel-based engine is the power source, the power source drive unit 611 may perform electronic control of the engine. As such the power source drive unit 611 may control, for example, the output torque of the engine. The power source drive unit 611 may adjust the output toque of the engine under control of the controller 170.

Ina case where an electric motor is the power source, the power source drive unit 611 may control the motor. The power source drive unit 611 may control, for example, the RPM and toque of the motor under control of the controller 170.

The transmission drive unit 612 may control a transmission.

The transmission drive unit 612 may adjust the state of the transmission. The transmission drive unit 612 may adjust a state of the transmission to a drive (D), reverse (R), neutral (N), or park (P) state.

Meanwhile, in a case where an engine is the power source, the transmission drive unit 612 may adjust a gear-engaged state to the drive position D.

The chassis drive unit 620 may control the operation of a chassis.

The chassis drive unit 620 may include a steering drive unit 621, a brake drive unit 622, and a suspension drive unit 623.

The steering drive unit 621 may perform electronic control of a steering apparatus provided inside the vehicle 100. The steering drive unit 621 may change the direction of travel of the vehicle 100.

The brake drive unit 622 may perform electronic control of a brake apparatus provided inside the vehicle 100. For example, the brake drive unit 622 may reduce the speed of the vehicle 100 by controlling the operation of a brake located at a wheel.

Meanwhile, the brake drive unit 622 may control a plurality of brakes individually. The brake drive unit 622 may apply a different degree-braking force to each wheel.

The suspension drive unit 623 may perform electronic control of a suspension apparatus inside the vehicle 100. For example, when the road surface is uneven, the suspension drive unit 623 may control the suspension apparatus so as to reduce the vibration of the vehicle 100.

Meanwhile, the suspension drive unit 623 may control a plurality of suspensions individually.

The door/window drive unit 630 may perform electronic control of a door apparatus or a window apparatus inside the vehicle 100.

The door/window drive unit 630 may include a door drive unit 631 and a window drive unit 632.

The door drive unit 631 may control the door apparatus. The door drive unit 631 may control opening or closing of a plurality of doors included in the vehicle 100. The door drive unit 631 may control opening or closing of a trunk or a tail gate. The door drive unit 631 may control opening or closing of a sunroof.

The window drive unit 632 may perform electronic control of the window apparatus. The window drive unit 632 may control opening or closing of a plurality of windows included in the vehicle 100.

The safety apparatus drive unit 640 may perform electronic control of various safety apparatuses provided inside the vehicle 100.

The safety apparatus drive unit 640 may include an airbag drive unit 641, a safety belt drive unit 642, and a pedestrian protection equipment drive unit 643.

The airbag drive unit 641 may perform electronic control of an airbag apparatus inside the vehicle 100. For example, upon detection of a dangerous situation, the airbag drive unit 641 may control an airbag to be deployed.

The safety belt drive unit 642 may perform electronic control of a seatbelt apparatus inside the vehicle 100. For example, upon detection of a dangerous situation, the safety belt drive unit 642 may control passengers to be fixed onto seats 110FL, 110FR, 110RL, and 110RR with safety belts.

The pedestrian protection equipment drive unit 643 may perform electronic control of a hood lift and a pedestrian airbag. For example, upon detection of a collision with a pedestrian, the pedestrian protection equipment drive unit 643 may control a hood lift and a pedestrian airbag to be deployed.

The lamp drive unit 650 may perform electronic control of various lamp apparatuses provided inside the vehicle 100.

The air conditioner drive unit 660 may perform electronic control of an air conditioner inside the vehicle 100. For example, when the inner temperature of the vehicle 100 is high, an air conditioner drive unit 660 may operate the air conditioner so as to supply cool air to the inside of the vehicle 100.

The vehicle drive device 600 may include a processor. Each unit of the vehicle drive device 600 may include its own processor.

The vehicle drive device 600 may operate under control of the controller 170.

The operation system 700 is a system for controlling the overall driving operation of the vehicle 100. The operation system 700 may operate in the autonomous driving mode.

The operation system 700 may include the driving system 710, the vehicle pulling-out system 740, and the vehicle parking system 750.

In some embodiments, the operation system 700 may further include other components in addition to the aforementioned components, or may not include some of the aforementioned component.

Meanwhile, the operation system 700 may include a processor. Each unit of the operation system 700 may include its own processor.

Meanwhile, the operation system 700 may control driving in the autonomous mode based on learning. In this case, the learning mode and an operating mode based on the premise of completion of learning may be performed. A description will be given below of a method of executing the learning mode and the operating mode by the processor of the operation system 700.

The learning mode may be performed in the aforedescribed manual mode. In the learning mode, the processor of the operation system 700 may learn a driving route and ambient environment of the vehicle 100.

The learning of the driving route may include generating map data for a route in which the vehicle 100 drives. Particularly, the processor of the operation system 700 may generate map data based on information detected through the object detection device 300 during driving from a departure to a destination.

The learning of the ambient environment may include storing and analyzing information about an ambient environment of the vehicle 100 during driving and parking. Particularly, the processor of the operation system 700 may store and analyze the information about the ambient environment of the vehicle based on information detected through the object detection device 300 during parking of the vehicle 100, for example, information about a location, size, and a fixed (or mobile) obstacle of a parking space.

The operating mode may be performed in the aforedescribed autonomous mode. The operating mode will be described based on the premise that the driving route or the ambient environment has been learned in the learning mode.

The operating mode may be performed in response to a user input through the input unit 210, or when the vehicle 100 reaches the learned driving route and parking space, the operating mode may be performed automatically.

The operating mode may include a semi-autonomous operating mode requiring some user's manipulations of the maneuvering device 500, and a full autonomous operating mode requiring no user's manipulation of the maneuvering device 500.

According to an embodiment, the processor of the operation system 700 may drive the vehicle 100 along the learned driving route by controlling the operation system 700 in the operating mode.

According to an embodiment, the processor of the operation system 700 may pull out the vehicle 100 from the learned parking space by controlling the vehicle pulling-out system 740 in the operating mode.

According to an embodiment, the processor of the operation system 700 may park the vehicle 100 in the learned parking space by controlling the vehicle parking system 750 in the operating mode. Meanwhile, in some embodiments, in a case where the operation system 700 is implemented as software, the operation system 700 may be a subordinate concept of the controller 170.

Meanwhile, in some embodiments, the operation system 700 may be a concept including at least one selected from among the user interface device 200, the object detection device 300, the communication device 400, the vehicle drive device 600, and the controller 170.

The driving system 710 may perform driving of the vehicle 100.

The driving system 710 may perform driving of the vehicle 100 by providing a control signal to the vehicle drive device 600 in response to reception of navigation information from the navigation system 770.

The driving system 710 may perform driving of the vehicle 100 by providing a control signal to the vehicle drive device 600 in response to reception of object information from the object detection device 300.

The driving system 710 may perform driving of the vehicle 100 by providing a control signal to the vehicle drive device 600 in response to reception of a signal from an external device through the communication device 400.

Conceptually, the driving system 710 may be a system that drives the vehicle 100, including at least one of the user interface device 200, the object detection device 300, the communication device 400, the maneuvering device 500, the vehicle drive device 600, the navigation system 770, the sensing unit 120, or the controller 170.

The driving system 710 may be referred to as a vehicle driving control device.

The vehicle pulling-out system 740 may perform an operation of pulling the vehicle 100 out of a parking space.

The vehicle pulling-out system 740 may perform an operation of pulling the vehicle 100 out of a parking space, by providing a control signal to the vehicle drive device 600 in response to reception of navigation information from the navigation system 770.

The vehicle pulling-out system 740 may perform an operation of pulling the vehicle 100 out of a parking space, by providing a control signal to the vehicle drive device 600 in response to reception of object information from the object detection device 300.

The vehicle pulling-out system 740 may perform an operation of pulling the vehicle 100 out of a parking space, by providing a control signal to the vehicle drive device 600 in response to reception of a signal from an external device.

Conceptually, the vehicle pulling-out system 740 may be a system that performs pulling-out of the vehicle 100, including at least one of the user interface device 200, the object detection device 300, the communication device 400, the maneuvering device 500, the vehicle drive device 600, the navigation system 770, the sensing unit 120, or the controller 170.

The vehicle pulling-out system 740 may be referred to as a vehicle pulling-out control device.

The vehicle parking system 750 may perform an operation of parking the vehicle 100 in a parking space.

The vehicle parking system 750 may perform an operation of parking the vehicle 100 in a parking space, by providing a control signal to the vehicle drive device 600 in response to reception of navigation information from the navigation system 770.

The vehicle parking system 750 may perform an operation of parking the vehicle 100 in a parking space, by providing a control signal to the vehicle drive device 600 in response to reception of object information from the object detection device 300.

The vehicle parking system 750 may perform an operation of parking the vehicle 100 in a parking space, by providing a control signal to the vehicle drive device 600 in response to reception of a signal from an external device.

Conceptually, the vehicle parking system 750 may be a system that performs parking of the vehicle 100, including at least one of the user interface device 200, the object detection device 300, the communication device 400, the maneuvering device 500, the vehicle drive device 600, the navigation system 770, the sensing unit 120, or the controller 170.

The vehicle parking system 750 may be referred to as a vehicle parking control device.

The navigation system 770 may provide navigation information. The navigation information may include at least one selected from among map information, information on a set destination, information on a route to the set destination, information on various objects along the route, lane information, and information on a current location of the vehicle.

The navigation system 770 may include a memory and a processor. The memory may store navigation information. The processor may control the operation of the navigation system 770.

In some embodiments, the navigation system 770 may update pre-stored information by receiving information from an external device through the communication device 400.

In some embodiments, the navigation system 770 may be classified as an element of the user interface device 200.

Based on trajectory information attributed to a driving road of a vehicle and a driving motion of the vehicle, a process for outputting a virtual driving road image on the driving road of the vehicle is described in detail with reference to FIGS. 8 to 24B as follows.

Here, the virtual driving road image is outputted in a manner of being configured in form of Augmented Reality (AR), and the virtual driving road image in the AR form will be described by being referred to as an AR carpet in the following description.

In addition, all control operations of the controller 170 described in the following may be identically performed by the processor 270 of the user interface device 200. In this case, the user interface device 200 may become a vehicle display device according to the present disclosure. In some cases, the user interface device 200 may further include at least one of the components within the object detection device 300, the components within the communication device 400, the components of the maneuvering device 500, the components of the vehicle drive device 600, the components of the chassis drive unit 620, the components of the door/window drive unit 630, the components of the safety apparatus drive unit 640, the components of the operation system 700, the navigation system 770, the sensing unit 120, the interface unit 130 and the memory 140, which are shown in FIG. 7, or may receive (or be provided with) information or data required for an operation of the present disclosure from the above-listed at least one by making a request thereto.

Figure 8:
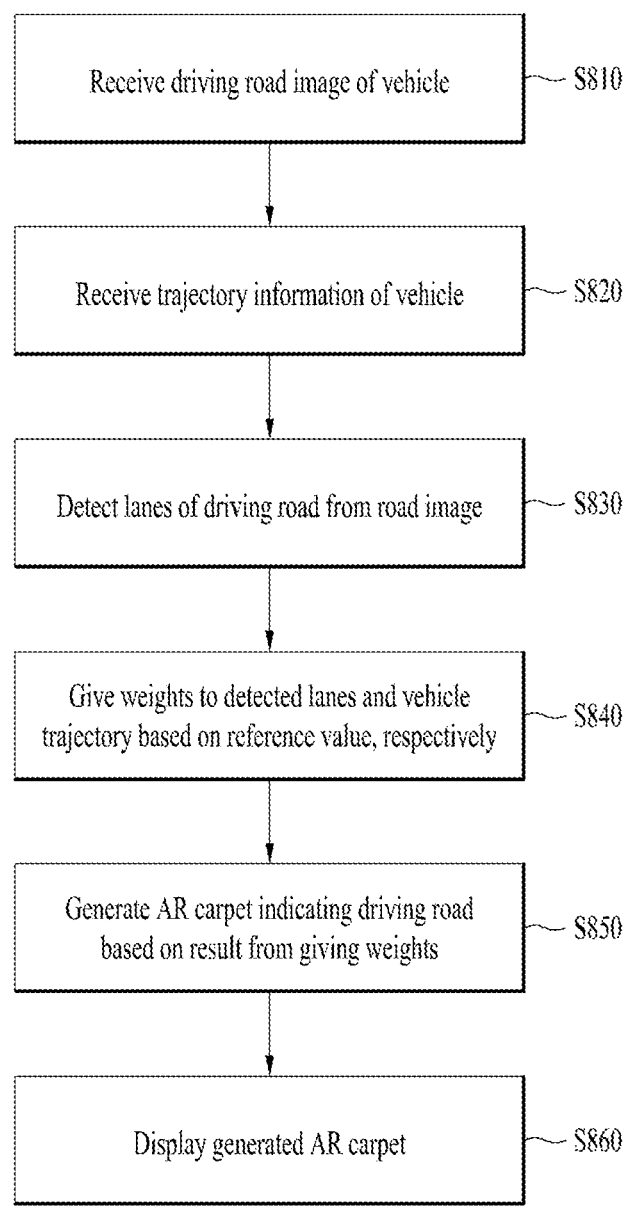
FIG. 8 is a flowchart to describe an AR carpet providing process of a display device for a vehicle according to one embodiment of the present disclosure.

FIG. 8 is a flowchart to describe an AR carpet providing process of a display device for a vehicle according to one embodiment of the present disclosure.

Referring to FIG. 8, once the vehicle 100 starts to run, the controller 170 of the vehicle 100 receives an image of a currently driving road in front of the vehicle 100 through the camera 310 installed on a front side of the vehicle 100 [S810] and also receives trajectory information attributed to a driving motion of the vehicle 100 through the sensing unit 120 [S820].

Here, the camera 310 includes at least one camera installed on the front side of the vehicle 100 for ADAS and is used to detect the number of lanes within the road on which the vehicle 100 is running.

The trajectory information may include information related to a steering wheel angle sensed through a wheel sensor of the sensing unit 120. For example, when a driver of the vehicle 100 maneuvers a steering wheel to change a driving direction of the vehicle 100, the trajectory information may become an angle value changed at an initial position of the steering wheel.

The controller 170 detects lanes within the road on which the vehicle 100 is running from the road image received from the camera 310 [S830].

For one example, the controller 170 may convert the colorful road image into a grayscale image in simple form, convert the grayscale image into a binary image again, extract white and black outlines from the binary image, extract straight line elements from the outlines, scan the detected straight line elements by starting with a virtual bottom of the image in a top direction, and detect a firstly detected straight line as a lane. The lane detecting operation is non-limited by the above manner, and a lane may be detected through lane detection algorithms of various types.

The controller 170 may classify a quality of the lane into a plurality of levels (e.g., very low, low, high, very high, etc.), determine that the quality of the lane detected by the above process belongs to which one of a plurality of the classified levels, and use the lane as a finally detected lane only if the determined quality level of the lane is equal to or higher than a preset reference level.

Subsequently, based on the preset reference value, the controller 170 gives weights to the detected lane and the trajectory of the vehicle, respectively [S840].

Here, the reference value includes the number of lanes of the driving road on which the vehicle 100 is running, and the controller 170 may give the weights to the detected lane and the vehicle trajectory, respectively based on the number of the lanes detected from the road image received through the camera 310.

Namely, the controller 170 may give different weights to the detected lane and the vehicle trajectory according to the detected lane number, respectively.

For example, if the detected lane number increases, the controller 170 gives a weight higher than that of the vehicle trajectory to the detected lane. If the detected lane number decreases, the controller 170 gives a weight higher than that of the lane to the vehicle trajectory.

Here, the detected lane number may become one of 0, 1, and 2. If the lane number is 0, since it corresponds to a situation that the vehicle 100 is running on a road that is not a vehicle-only road, the controller 170 gives a more weight to the vehicle trajectory than the detected lane so that an AR carpet can be displayed according to the trajectory of the vehicle.

If the detected lane number is 1, since a left or right one of the lanes of the road on which the vehicle is running is detected only, the controller 180 gives the same weight to each of the detected lanes and the vehicle trajectory so that an AR carpet can be displayed according to the detected lanes and the vehicle trajectory.

If the detected lane number is 2, both of the right and left lanes of the road on which the vehicle is running are detected, which corresponds to a situation that the vehicle is running along the road. Hence, the controller 170 gives a more weight to the detected lanes than the vehicle trajectory so that an AR carpet can be displayed along the driving road of the vehicle.

The reference value may further include a length of a lane of the driving road of the vehicle in addition to the lane number of the driving road of the vehicle, and the controller 170 may give weights to the detected lane and the vehicle trajectory based on the lane number detected from the road image and the length of the detected lane.

For example, if the detected lane number increases and the length of the detected lane increases, a weight higher than that of the vehicle trajectory may be given to the lane. If the detected lane number decreases and the length of the detected lane decreases, a weight higher than that of the lane may be given to the vehicle trajectory.

A process forgiving weights to the detected lane and the vehicle trajectory will be described in detail with reference to FIGS. 11 to 16 later.

Meanwhile, the operation of the lane detection of the road on which the vehicle is running, the lane number detection operation and the lane length detection operation may be performed by the controller 170 of the present disclosure. Alternatively, the camera 310 of the object detection device 300 or the processor 370 of the object detection device 300 may perform such operations instead and then send the corresponding results to the controller 170. Namely, the object detection device 300 of the present disclosure play a role as ADAS, thereby performing the operations of the lane detection, the lane number detection and the lane length detection.

Subsequently, based on the result from giving the weights, the controller 170 generates an AR carpet that is a virtual driving road image indicating a driving road of the vehicle [S850] and displays the generated AR carpet on the display unit 251 of the user interface device 200 [S860].

Here, the display unit 251 includes a Head-Up Display (HUD) displaying the AR carpet image by projecting it onto a windshield of the vehicle 100. In this case, the controller 170 may control the head-up display to display the AR carpet on a region of the vehicle windshield that shows the road on which the vehicle is actually running.

The display unit 251 includes a display device having a screen of a touchscreen type. In this case, the controller 170 may display a road image received from the camera 310 on the screen of the display unit 251 and also display the AR carpet on a region corresponding to the driving road of the vehicle within the displayed road image.

In doing so, the controller 170 may display the AR carpet with reference to (or centering on) a position of the vehicle within the driving road of the vehicle 100.

If one of the right and left lanes of the driving road of the vehicle is detected only, the controller 170 may display the AR carpet on the driving road based on the detected lane and a width of a previously driven road.

The controller 170 may adjust an image width of the AR carpet based on at least one of the number of the detected lanes, the quality of the detected lanes, and the driving speed of the vehicle.

For one example, if the detected lane number corresponds to a case that both of the right and left lanes are detected, the controller 170 may display the image width of the AR carpet in maximum size within the range not exceeding the width of the driving road of the vehicle. If the detected lane number corresponds to a case that either the right lane or the left lane is detected, the controller 170 may display the image width of the AR carpet in half size of the width of the driving road of the vehicle. Alternatively, if the detected lane number corresponds to a case that either the right lane or the left lane is detected, the controller 170 may display the AR carpet up to the center of the driving road of the vehicle with reference to the detected lane. If the detected lane number is 0, the controller 170 may display the image width of the AR carpet in minimum size smaller than a half of the width of the driving road of the vehicle or may not display it at all.

For another example, the controller 170 may classify the quality (e.g., resolution) of the detected lane into a plurality of preset quality levels and display the AR carpet in size corresponding to a quality level belonging to the quality of the detected lane.

For example, when a plurality of the quality levels include a high quality level, a middle quality level and a low quality level, if the quality of the detected lane belongs to the high quality level, the controller 170 may display the image width of the AR carpet in maximum size within the range not exceeding the width of the driving road of the vehicle. If the quality of the detected lane belongs to the middle quality level, the controller 170 may display the image width of the AR carpet in half size of the width of the driving road of the vehicle. If the quality of the detected lane belongs to the low quality level, the controller 170 may display the image width of the AR carpet in minimum size smaller than a half of the width of the driving road of the vehicle or may not display it at all.

For another example, the controller 170 may detect a driving speed of a currently running vehicle through the speed sensor of the sensing unit 120, classify the detected driving speed of the vehicle into a plurality of speed sections, and display the AR carpet in size corresponding to the speed section belonging to the detected driving speed of the vehicle.

For example, when a plurality of the speed sections include a high speed section, a middle speed section and a low sped section, if the detected driving speed of the vehicle belongs to the high speed section, since a front view may be possibly blocked by the AR carpet, the controller 170 may display the image width of the AR carpet in minimum size smaller than a half of the width of the driving road of the vehicle or may not display it at all, for the driving safety. If the detected driving speed of the vehicle belongs to the middle speed section, the controller 170 may display the image width of the AR carpet in half size of the width of the driving road of the vehicle. If the detected driving speed of the vehicle belongs to the middle speed section, the controller 170 may display the image width of the AR carpet in maximum size within the range not exceeding the width of the driving road of the vehicle.

FIGS. 9A to 10B are diagrams to describe a process for detecting lanes within a driving road of a vehicle according to the present disclosure.

Figure 9A:
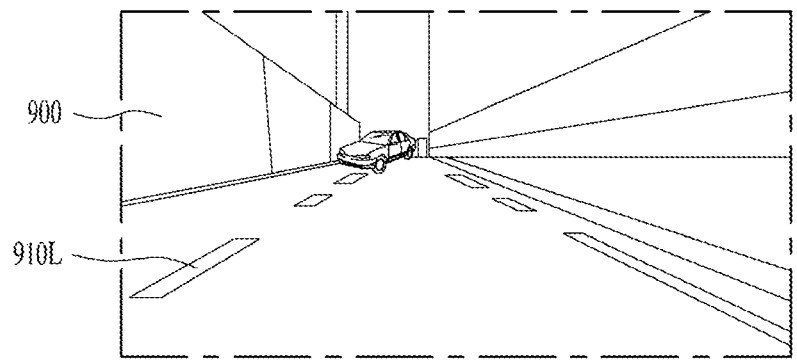
FIGS. 9A to 10B are diagrams to describe a process for detecting lanes within a driving road of a vehicle according to the present disclosure.
Figure 9B:
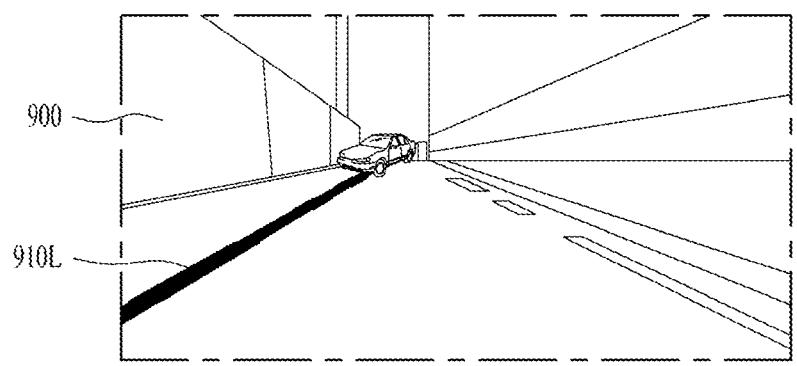

First of all, FIGS. 9A and 9B show a process for detecting 1 lane within a driving road of a vehicle, and FIG. 9A shows that a road image 900 including a driving road on which a vehicle is running is received through the camera 310.

Namely, as shown in FIG. 9A, a left lane 910L exists within the driving road on which the vehicle is running. In this case, the controller 170 may convert the road image 900 into a grayscale image in simple form, convert the grayscale image into a binary image again, extract white and black outlines from the binary image, detect straight line elements from the extracted outlines, scan the detected straight line elements by starting with a virtual bottom of the road image 900 in a top direction, and, as shown in FIG. 9B, detect a firstly detected straight line as the left lane 910L.

Figure 10A:
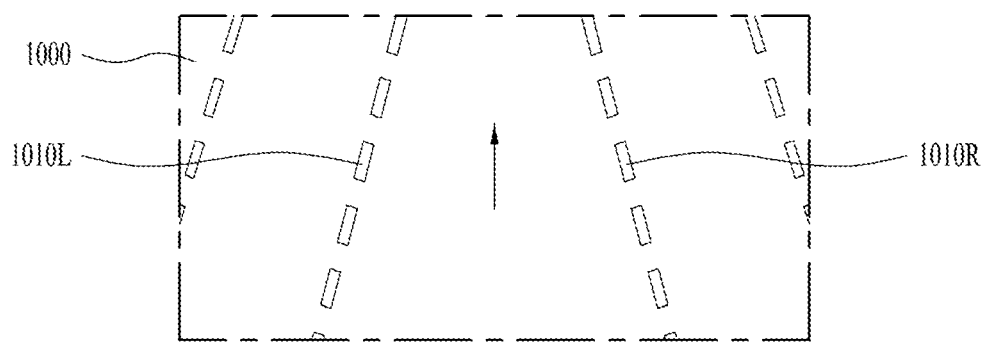
Figure 10B:
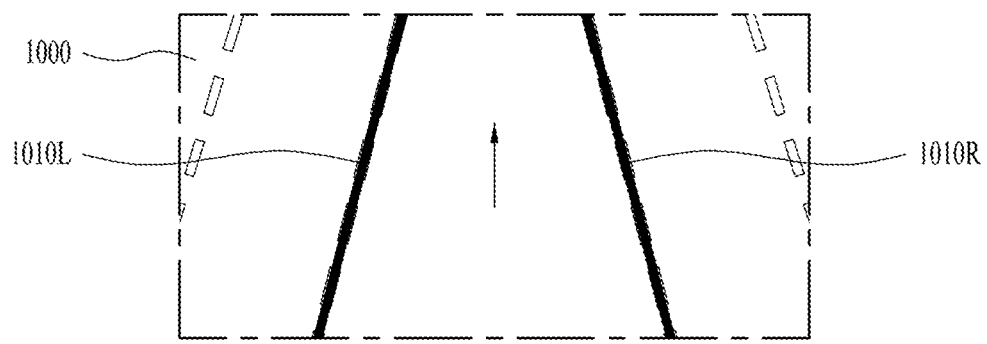

Secondly, FIGS. 10A and 10B show a process for detecting 2 lanes within a driving road of a vehicle, and FIG. 10A shows that a road image 1000 including a driving road on which a vehicle is running is received through the camera 310.

Namely, as shown in FIG. 10A, a left lane 1010L and a right lane 110R exist within the driving road on which the vehicle is running. In this case, the controller 170 may convert the road image 1000 into a grayscale image in simple form, convert the grayscale image into a binary image again, extract white and black outlines from the binary image, detect straight line elements from the extracted outlines, scan the detected straight line elements by starting with a virtual bottom of the road image 1000 in a top direction, and, as shown in FIG. OB, detect firstly detected straight lines as the left lane 1010L and the right lane 1010R.

The process forgiving weights to the detected lane and the vehicle trajectory is described in detail with reference to FIGS. 11 to 16 as follows.

FIGS. 11 to 16 are diagrams to describe a process for generating an AR carpet by giving weights to a detected lane and a vehicle trajectory according to the present disclosure.

First of all, FIG. 11 shows weights given to the detected lane and the vehicle trajectory, respectively by taking the number of lanes detected from a road image as a reference value.

Figure 12A:
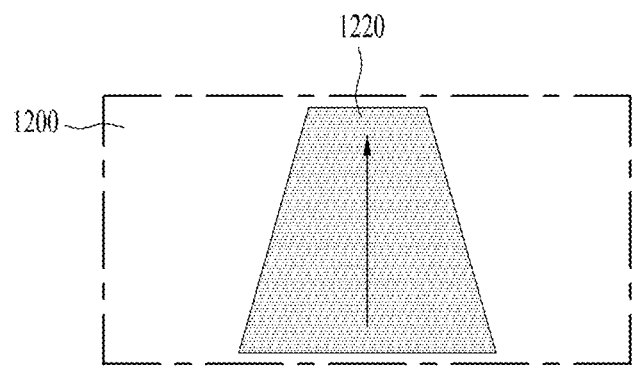
Figure 12B:
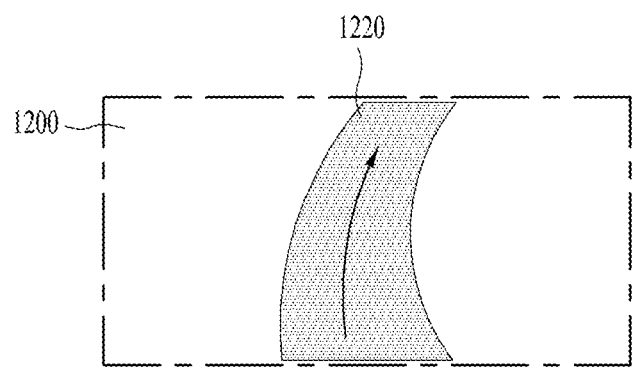

For one example, in FIGS. 11 to 12B, if the lane number of a driving road on which the vehicle 100 is running is detected as 0 from a road image 1200, the controller 170 gives weights of 0% and 100% to the lane and the vehicle trajectory, respectively, thereby generating and displaying an AR carpet 1220 in a direction corresponding to the vehicle trajectory.

Namely, if the lane number is 0, it corresponds to a situation that the vehicle 100 is running on a road that is not vehicle-only. Hence, the controller 170 gives the weight more than that of the detected lane to the vehicle trajectory, whereby the AR carpet 1220 can be displayed according to the trajectory of the vehicle.

For one example, referring to FIGS. 12A and 12B), in case that the lane number of a driving road on which the vehicle 100 is running is detected as 0 within a road image 1200, an AR carpet 1220 is displayed in a direction corresponding to a vehicle trajectory. FIG. 12A shows that the vehicle trajectory is a straight trajectory, and FIG. 12B shows that the vehicle trajectory is a trajectory of turning right at a prescribed angle.

Figure 13:
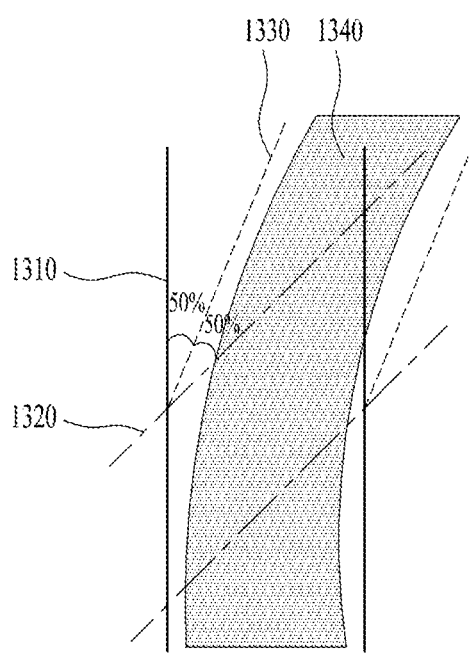

For another example, in FIG. 11 and FIG. 13, if the lane number of a driving road on which the vehicle 100 is running is detected as 1 that corresponds to a left or right lane from a road image, the controller 170 gives the same weight of 50% to each of the lane and the vehicle trajectory, thereby generating and displaying an AR carpet 1340.

Namely, as shown in FIG. 13, the controller 170 may determine a direction 1330, which divides a space between a direction 1310 faced by a lane of a driving road on which the vehicle 100 is running and a direction 1320 faced by the vehicle trajectory in half within the road image, as a direction faced by the driving road on which the vehicle will run, and then generate and display an AR carpet 1340 in the determined direction faced by the driving road.

Figure 14:
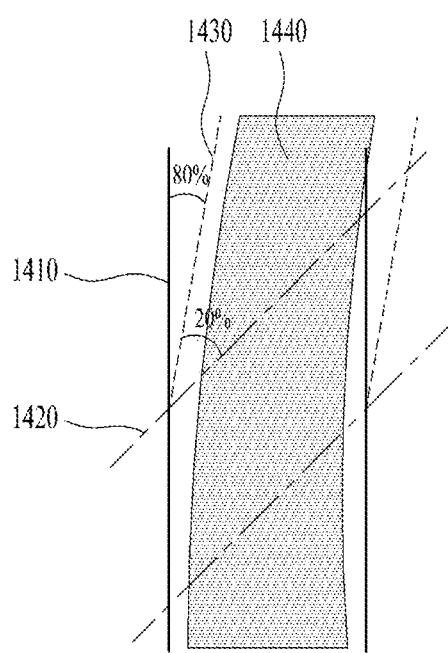

For another example, in FIG. 11 and FIG. 14, if the lane number of a driving road on which the vehicle 100 is running is detected as 2 that corresponds to a left lane and a right lane, the controller 170 gives weights of 80% and 20% to the lanes and the vehicle trajectory, respectively, thereby generating and displaying an AR carpet 1440.

Namely, as shown in FIG. 14, the controller 170 may determine a direction 1430, which is inclined by 80% to a direction 1410 faced by a lane of a driving road on which the vehicle 100 is running between the direction 1410 and a direction faced by the vehicle trajectory 1420 within a road image, as a direction faced by the driving road on which the vehicle will run, and then generate and display an AR carpet 1440 in the determined direction faced by the driving road.

By taking the lane number and length detected from a road image as reference values, FIG. 15 shows weights given to the detected lane and vehicle trajectory, respectively.

For one example, if the lane number of a driving road on which a vehicle is running is detected as 1 from a road image, the controller 170 gives weights of 0% and 100% to the lane and the vehicle trajectory, respectively, thereby generating and displaying an AR carpet in a direction corresponding to the vehicle trajectory.

For another example, the controller 170 classifies a length of a lane of a driving road on which a vehicle is running into a plurality of lengths (e.g., short, middle, long) from a road image. If the lane number of the driving road on which the vehicle is running is detected as 1 that corresponds to a left or right lane from the road image and a length of the 1 detected lane belongs to the short length among a plurality of the lengths, the controller 170 gives weights of 30% and 70% to the lane and the vehicle trajectory, respectively, thereby generating and displaying an AR carpet.

Namely, the controller 170 may determine a direction, which is inclined by 70% to a direction faced by the vehicle trajectory between a direction faced by a lane of a driving road on which the vehicle is running and the direction faced by the vehicle trajectory within a road image, as a direction faced by the driving road on which the vehicle will run, and then generate and display an AR carpet.

For another example, if the lane number of a driving road on which a vehicle is running is detected as 1 that corresponds to a left or right lane from a road image and a length of the 1 detected lane belongs to a middle length among a plurality of the lengths, the controller 170 gives weights of 40% and 60% to the lane and the vehicle trajectory, respectively, thereby generating and displaying an AR carpet.

Namely, the controller 170 may determine a direction 1430, which is inclined by 60% to a direction faced by the vehicle trajectory between a direction faced by a lane of a driving road on which the vehicle is running and a direction faced by the vehicle trajectory within a road image, as a direction faced by the driving road on which the vehicle will run, and then generate and display an AR carpet in the determined direction faced by the driving road.

For another example, if the lane number of a driving road on which the vehicle is running is detected as 1 that corresponds to a left or right lane from a road image and a length of the 1 detected lane belongs to a long length among a plurality of the lengths, the controller 170 gives weights of 50% and 50% to the lane and the vehicle trajectory, respectively, thereby generating and displaying an AR carpet.

Namely, the controller 170 may determine a direction, which divides a space between a direction faced by a lane of a driving road on which the vehicle is running and a direction faced by the vehicle trajectory in half, as a direction faced by a driving road on which the vehicle will run, and then generate and display an AR carpet in the determined direction faced by the driving road.

For another example, if the lane number of a driving road on which the vehicle running is detected as 2 that corresponds to a left lane and a right lane and a length of the detected lane belongs to a short length among a plurality of the lengths, the controller 170 gives weights of 60% and 40% to the lanes and the vehicle trajectory, respectively, thereby generating and displaying an AR carpet.

Namely, the controller 170 may determine a direction, which is inclined by 60% to a direction faced by a lane of a driving road on which the vehicle is running between the direction faced by the lane and a direction faced by the vehicle trajectory within a road image, as a direction faced by the driving road on which the vehicle will run, and then generate and display an AR carpet in the determined direction faced by the driving road.

For another example, if the lane number of a driving road on which the vehicle running is detected as 2 that corresponds to a left lane and a right lane and a length of the detected lane belongs to a middle length among a plurality of the lengths, the controller 170 gives weights of 80% and 20% to the lanes and the vehicle trajectory, respectively, thereby generating and displaying an AR carpet.

Namely, the controller 170 may determine a direction, which is inclined by 80% to a direction faced by a lane of a driving road on which the vehicle is running between the direction faced by the lane and a direction faced by the vehicle trajectory within a road image, as a direction faced by the driving road on which the vehicle will run, and then generate and display an AR carpet in the determined direction faced by the driving road.

For another example, if the lane number of a driving road on which the vehicle running is detected as 2 that corresponds to a left lane and a right lane and a length of the detected lane belongs to a long length among a plurality of the lengths, the controller 170 gives weights of 100% and 0% to the lanes and the vehicle trajectory, respectively, thereby generating and displaying an AR carpet.

Namely, the controller 170 may determine a direction faced by a lane of a driving road on which the vehicle is running between the direction faced by the lane and a direction faced by the vehicle trajectory within a road image, as a direction faced by the driving road on which the vehicle will run, and then generate and display an AR carpet in the determined direction faced by the driving road.

As described above, the reason why the lane number and the lane length are considered for the AR carpet generation is described as follows.

First of all, when the lane length increases and the lane number increases, in case of a situation that a vehicle is running on a straight road, on which the vehicle should run at high speed, like a freeway or highway, if an AR carpet is provided by focusing on a lane direction of a road on which the vehicle is running, it will help driver's safety driving. On the other hand, when the lane length decreases and the lane number decreases, in case of a situation that a vehicle is running on a road, on which the vehicle should run at low speed by frequently changing a driving direction, like an alley or a narrow path, if an AR carpet is provided by focusing on a trajectory direction of the vehicle, it will help driver's safety driving.

Referring to FIG. 16, if the number of lane(s) of a driving road on which a vehicle is running is detected as 1 or more from a road image and a condition that a state that a quality of the detected lane is equal to or higher than a specific level (high) among a plurality of preset levels (e.g., very low, low, high, and very high) is maintained over a preset time (e.g., 3 seconds) is satisfied, the controller 170 gives weights of 100% and 0% to the lane and the vehicle trajectory, respectively, thereby generating and displaying an AR carpet.

If the above condition is not satisfied, the controller 170 gives weights of 0% and 1000% to the lane and the vehicle trajectory, respectively, thereby generating and displaying an AR carpet.

In some implementations, the controller 170 may generate an item indicating a driving speed of a currently running vehicle and a destination route related to a route to a destination and display the generated item within the AR carpet. In the following description, the item indicating the driving speed and the destination route will be referred to as a moving bar.

The moving bar will be described in detail with reference to FIGS. 17 to 19 as follows.

Figure 17:
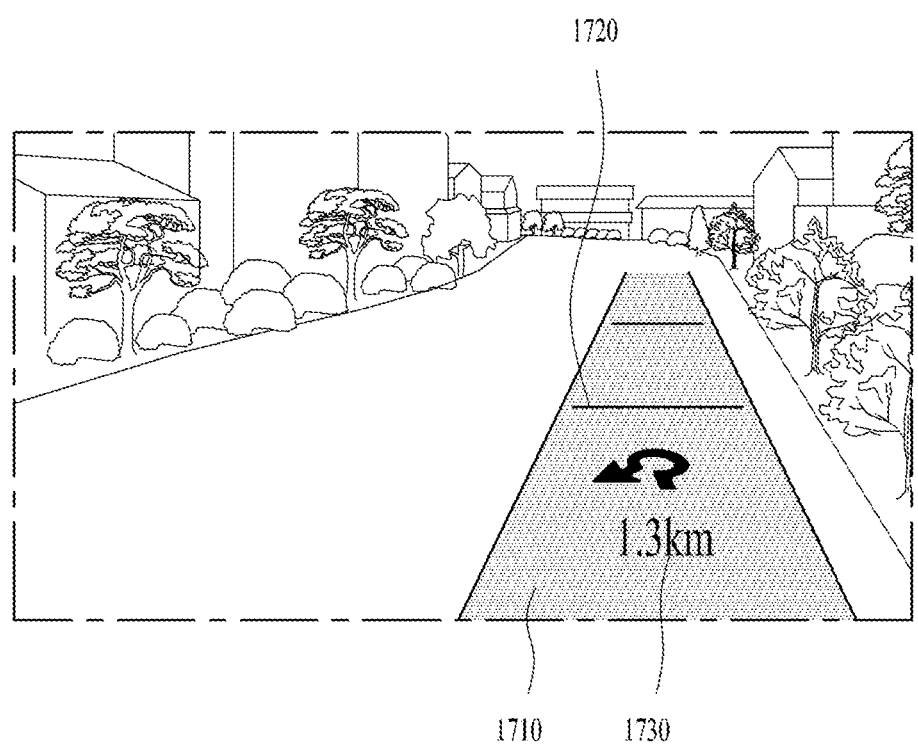
FIGS. 17 to 19 are diagrams to describe a moving bar indicating a driving speed and destination route of a vehicle displayed within an AR carpet according to the present disclosure.
Figure 18:
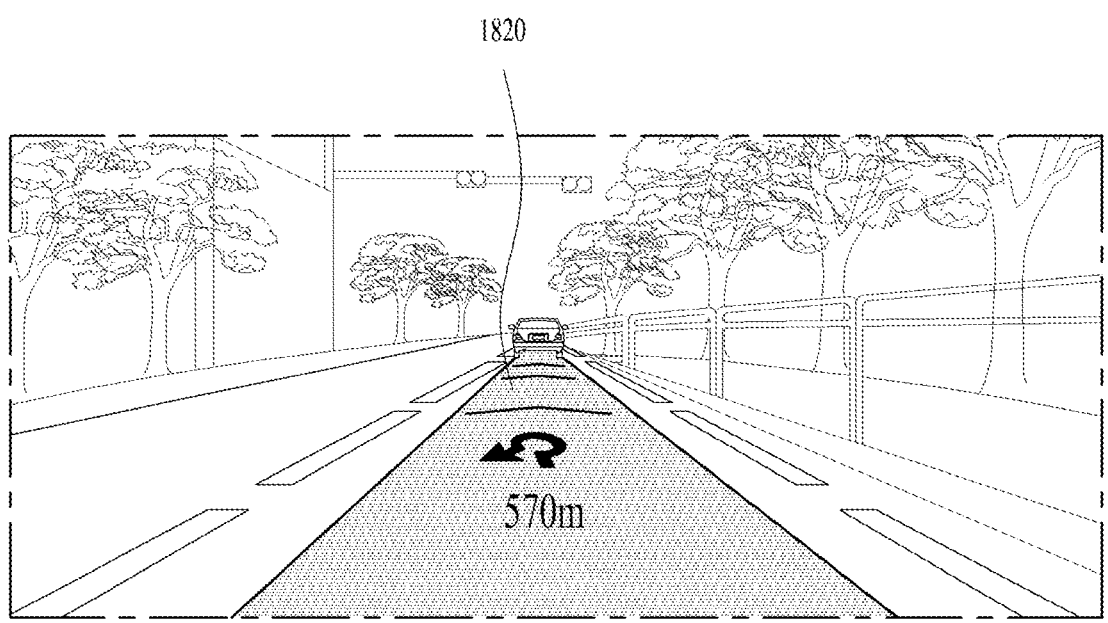
Figure 19:
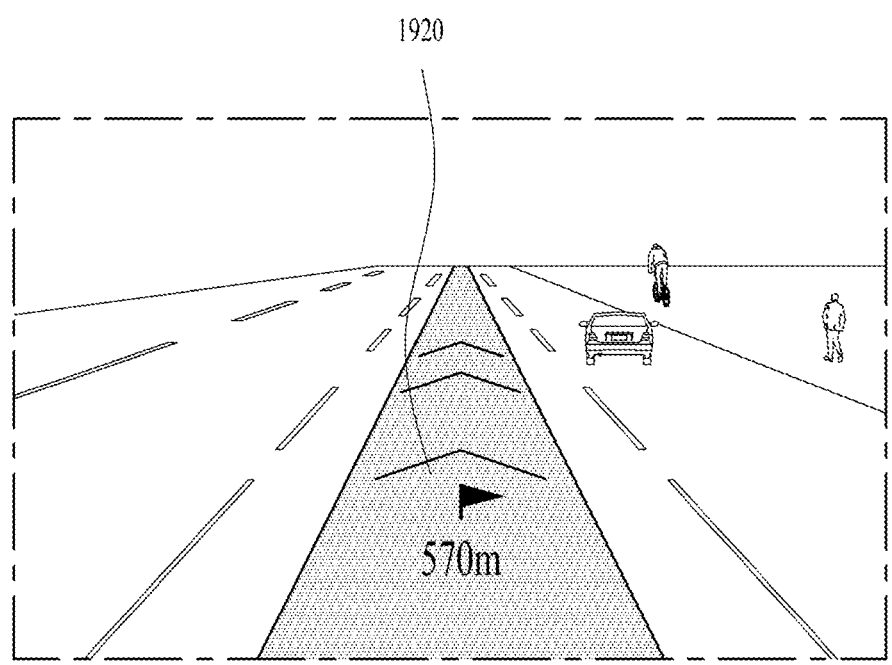

FIGS. 17 to 19 are diagrams to describe a moving bar indicating a driving speed and a destination route of a vehicle displayed within an AR carpet according to the present disclosure.

Referring to FIG. 17, the controller 170 receives driving speed information related to a driving speed of a currently running vehicle from the speed sensor of the sensing unit 120 and also receives route information related to a route to a destination set up by a user from the navigation system 770.

Based on the received driving speed information and route information, the controller 170 may generate a moving bar indicating the driving speed and the destination route 1730 and display the generated moving bar within an AR carpet 1710.

In doing so, the driving speed appearing on the moving bar may be represented through a shape change of a specific symbol. Namely, when the driving sped is 0 km/h, the controller 170 represents the specific symbol as a horizontal line having an angle of 180°. If the driving speed increases gradually, the controller 170 may display the horizontal line in a manner that the horizontal line is bent at the center of its own so as to be gradually changed into a vertical line having an angle of 90°.

The controller 170 may display the specific symbol, which has a shape changing according to a change of the driving speed, in a manner that the specific symbol is moved within the AR carpet 1710 from a bottom direction to a top direction repeatedly and automatically, and determine an automatic moving speed of the specific symbol according to the change of the driving speed. Namely, if the driving speed increases, the controller 170 may gradually accelerate the automatic moving speed of the specific symbol in proportion to the driving speed. Or, if the driving speed decreases, the controller 170 may gradually decelerate the automatic moving speed of the specific symbol in proportion to the driving speed.

The controller 170 may display the AR carpet 1710 in a manner of changing a width size of the AR carpet 1710 according to a change of the driving speed. Namely, if the driving speed increases, the controller 170 may gradually decrease a width of the AR carpet 1710 in inverse proportion to the driving speed. If the driving speed decreases, the controller 170 may gradually increase a width of the AR carpet 1710 in inverse proportion to the driving speed.

FIG. 17 shows that when a vehicle is stopped, a shape of a symbol indicating a driving speed of the vehicle is changed into a horizontal line 1720 having an angle of 180°. FIG. 18 shows that when the stopped car starts and runs at a first speed, the horizontal line 1720 is changed into a first curve 1820 in a manner of being bent at a first angle with reference to a center of the horizontal line 1720. FIG. 19 shows that when the vehicle is running at a second speed faster than the first speed, the first curve 1820 is changed into a second curve 1930 bent at a second angle greater than the first angle.

In some implementations, as described above, while an AR carpet is displayed on a driving road of a vehicle, if a driving state of the vehicle meets a preset condition, navigation information on a destination, which is provided by the navigation system 77-, may be displayed instead of the AR carpet.

A process for providing navigation information instead of an AR carpet is described in detail with reference to FIGS. 20A to 22B as follows.

FIGS. 20A to 22B are diagrams to describe a process for providing navigation information on a destination instead of an AR carpet if a driving state of a vehicle corresponds to a preset condition according to the present disclosure.

Figure 20A:
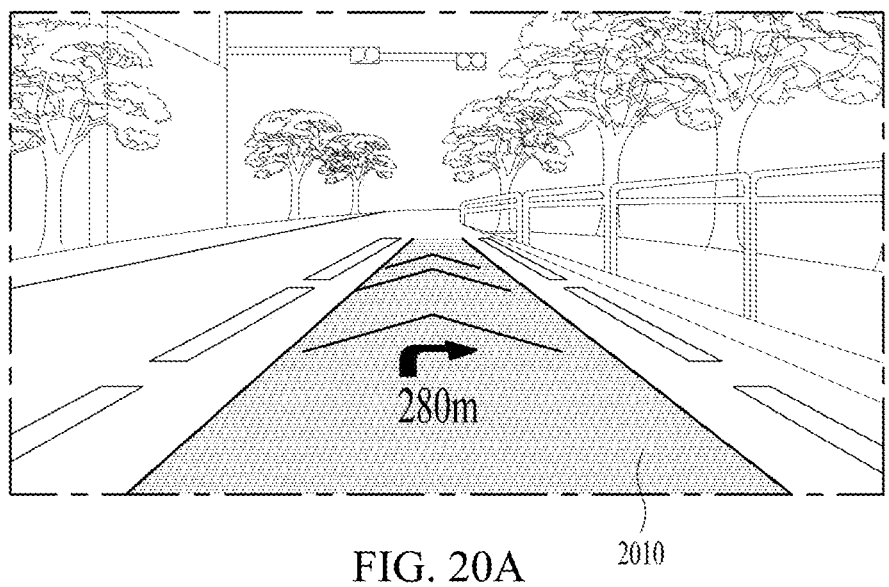
FIGS. 20A to 22B are diagrams to describe a process for providing navigation information on a destination instead of an AR carpet if a driving state of a vehicle corresponds to a preset condition according to the present disclosure.

First of all, FIG. 20A shows an AR carpet 2010 displayed on a driving road of the above described vehicle.

Figure 20B:
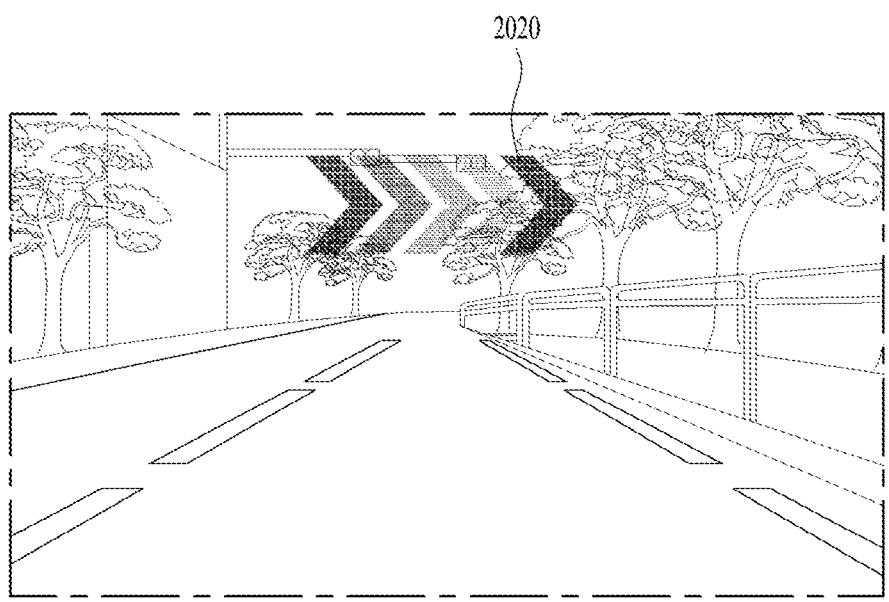

Here, if a driving state of the vehicle corresponds to a preset condition, as shown in FIG. 20B, the controller 170 displays an item 2020 indicating navigation information on a destination instead of the AR carpet 2010.

For one example, the preset condition includes a condition that a turn point exists within a preset distance from a location of the vehicle. In this case, the controller 170 receives navigation information related to a destination route of the vehicle from the navigation system 770, stops displaying the AR carpet 2010 in case of presence of the turn point within the preset distance from the location of the vehicle based on the received navigation information, generates an item 2020 indicating an exit direction of the turn point based on the received navigation information, and displays the generated item 2020 at a position corresponding to the exit direction of the turn point.

In doing so, if the display unit 251 includes a Head-Up Display (HUD), the controller 170 may control the head-up display to display the item 2020 on a region, from which the position corresponding to the exit direction of the turn point is seen, in a whole region of a windshield of the vehicle.

In addition, if the display unit 251 includes a display device having a screen of a touchscreen type, the controller 170 may display a road image received from the camera 310 on the screen of the display unit 251 and display the item 2020 at the position corresponding to the exit direction of the turn point within the displayed road image.

For another example, as shown in FIGS. 21A to 22B, the preset condition includes a condition that the turn point exist and that an object larger than a preset area exists on a region (e.g., windshield or road image) in which an AR carpet is displayed. In this case, if it is determined that an object larger than a preset area (or size) exists within a preset distance in front from a driving road, on which the AR carpet is displayed, based on a road image received through the camera 310, the controller 170 stops displaying the AR carpet, generates an item indicating an exit direction of the turn point based on the received navigation information, and displays the generated item at the position corresponding to the exit direction of the turn point.

Figure 21A:
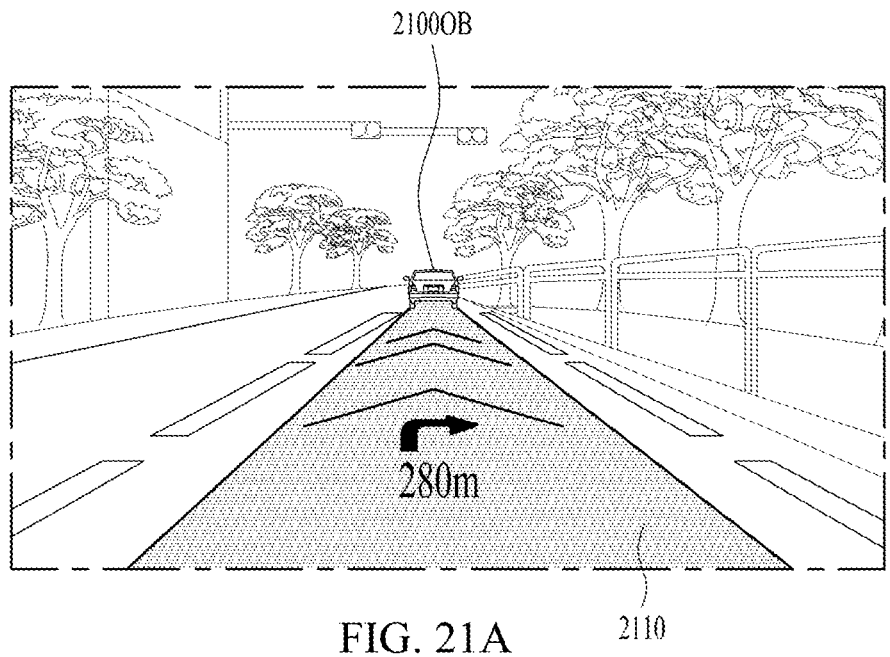
Figure 21B:
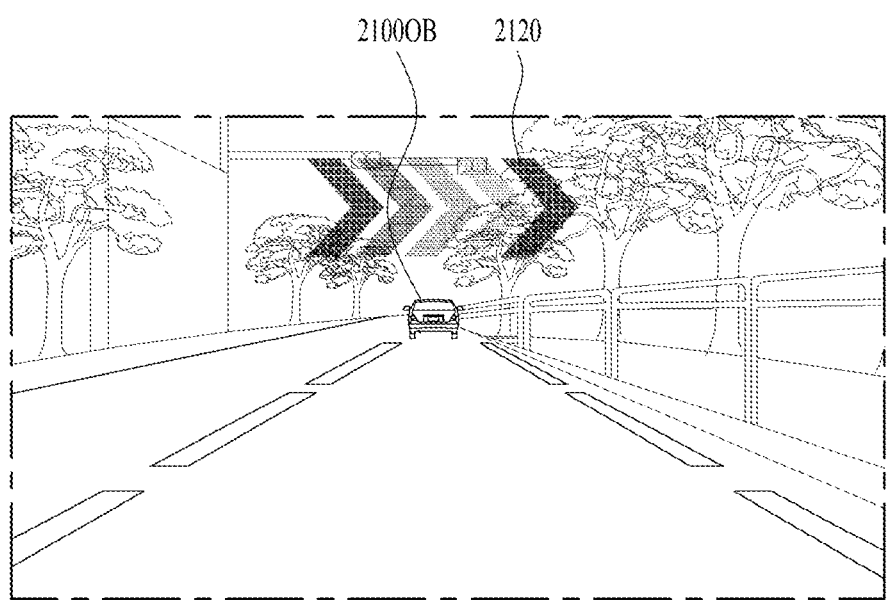

For one example, FIG. 21A shows that the object is another vehicle 2100OB located within the preset distance from the front of the currently running vehicle. In this case, as shown in FIG. 21B, if another vehicle 2100OB located within the preset distance from the front of the currently running vehicle, the controller 170 stops displaying the AR carpet 2110 and displays an item 2120 indicating the exit direction of the turn point at the position corresponding to the exit direction of the turn point.

Figure 22A:
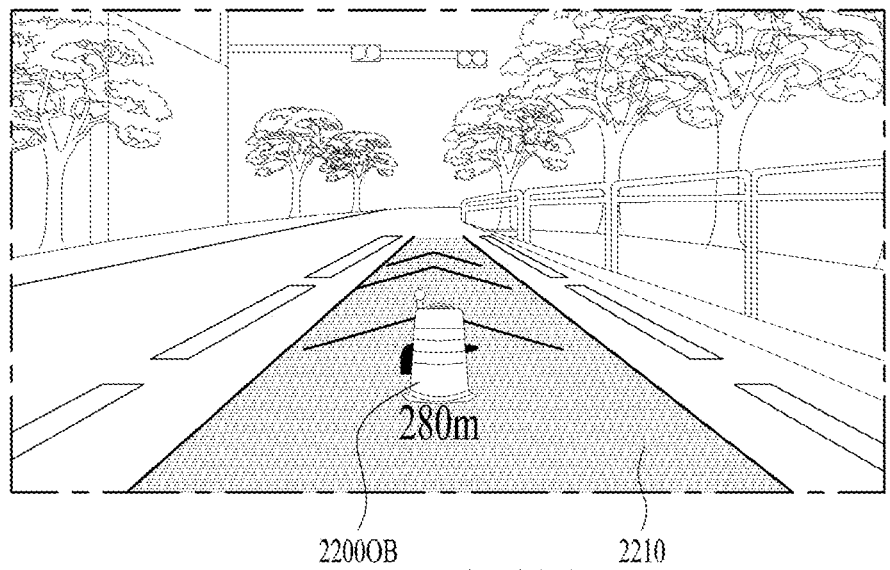
Figure 22B:
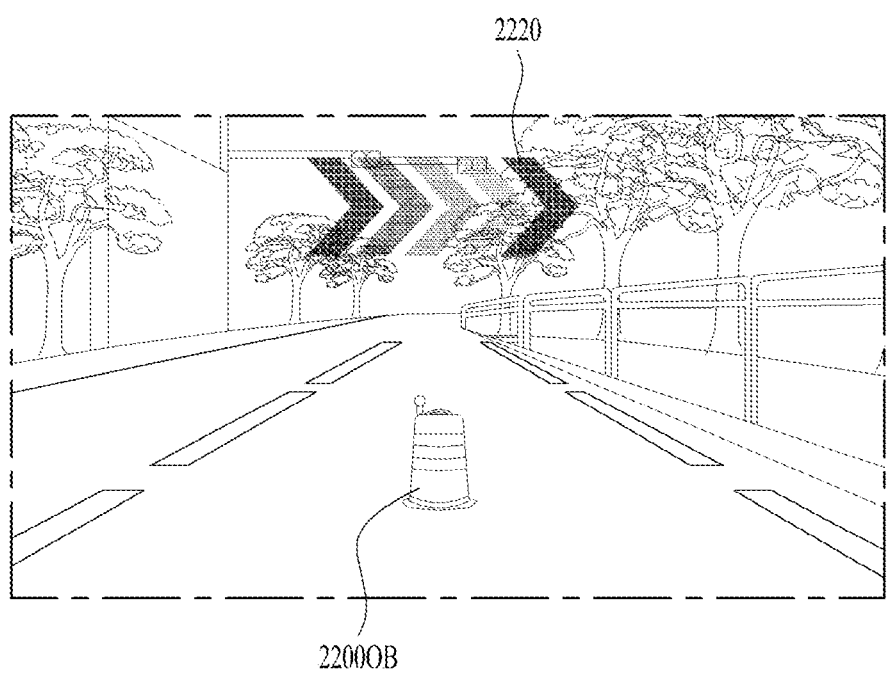

For another example, FIG. 22A shows that the object is an obstacle 2200OB larger than a preset area (or size) located in a region on which the AR carpet 2210 is displayed. In this case, as shown in FIG. 22B, if an obstacle 2200OB larger than a preset area (or size) is located in the region on which the AR carpet 2210 is displayed, the controller 170 stops displaying the AR carpet 2110 and displays an item 2220 indicating the exit direction of the turn point at the position corresponding to the exit direction of the turn point.

In some implementations, based on the navigation information and the speed of the currently running vehicle, if an intersection exists within a preset distance and the vehicle is going to enter the intersection in a preset time, the controller 170 may stop displaying the AR carpet and display an item indicating the intersection entry at a position corresponding to the intersection.

In addition, although the AR carpet is displayed on the driving road of the vehicle, if the matching accuracy of the AR carpet with the driving road becomes equal to or lower than a preset level, the controller 170 may stop displaying the AR carpet and display the item.

Figure 23:
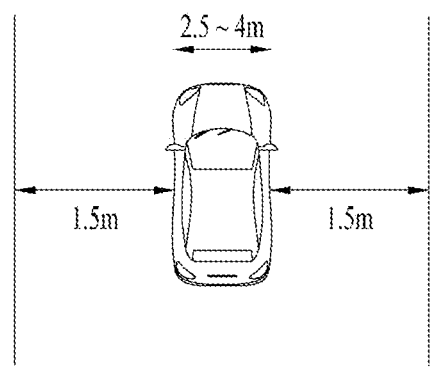
FIG. 23 is a diagram to describe a process for proving an AR carpet in case of detecting a partial lane only according to the present disclosure.

FIG. 23 is a diagram to describe a process for proving an AR carpet despite detecting a partial lane only according to the present disclosure.

FIG. 23 shows a width between a left lane and a right lane with reference to a car width range of a vehicle and a location of the vehicle located at the center of a road.

Namely, although one of left and right lanes of a driving road of a vehicle is detected only, the controller 170 may generate and display an AR carpet based on the detected lane and a width of a previously driven road.

In addition, although one of left and right lanes of a driving road of a vehicle is detected only, the controller 170 may generate and display an AR carpet based on a width range of the vehicle and a width of the detected lane.

Figure 24A:
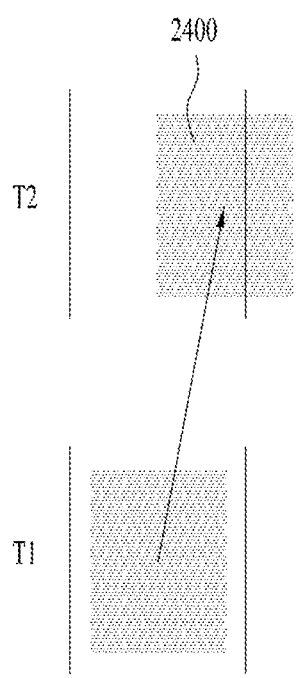
FIGS. 24A and 24B are diagrams to describe a movement display process of an AR carpet according to the present disclosure.
Figure 24B:
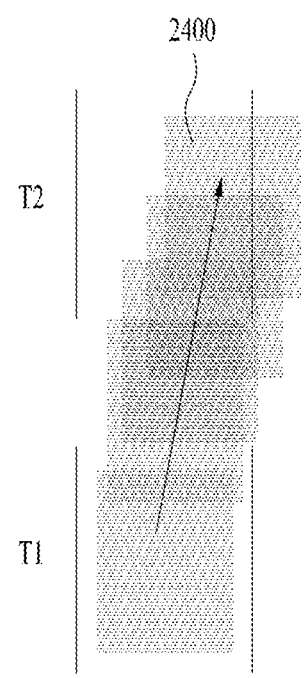

Finally, FIGS. 24A and 24B are diagrams to describe a movement display process of an AR carpet according to the present disclosure.

As shown in FIG. 24A, an AR carpet 2400 is displayed on a driving road of a vehicle by being real-time updated because of a movement of the vehicle that is running.

Yet, as shown in FIG. 24A, if the vehicle runs in a curve section or makes a turn, the AR carpet is moved rapidly like the change from T1 to T2. Hence, the AR carpet may interrupt driver's safe driving or look unstable.

Therefore, as shown in FIG. 24B, if the AR carpet 2400 is displayed in a manner of being moved from the position T1 to the position T2, the controller 170 divides a distance from the position T1 to the position T2 into two or more preset sections and controls the AR carpet 2400 to be displayed in a manner of being sequentially moved through a plurality of the sections, whereby the AR carpet 2400 can be displayed in a manner of being smoothly moved despite the rapid position change.

It will be appreciated by those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A display device for a vehicle, the display device comprising:
   a display unit; and
   a controller configured to:
   receive an image of a road in which the vehicle is located and trajectory information providing a trajectory of vehicle movement,
   detect one or more lanes of the road based on the received image of the road,
   assign weights to (i) the detected one or more lanes and (ii) the trajectory of vehicle movement, respectively, based on a preset reference value,
   generate a virtual road image providing a direction based on the assigned weights, and
   control the display unit to display the generated virtual road image,
   wherein the preset reference value comprises a number of the detected one or more lanes,
   wherein the controller is configured to assign, based on the number of the detected one or more lanes, the weights to the detected one or more lanes and the trajectory of vehicle movement,
   wherein the preset reference value further comprises a length of the detected lane in which the vehicle is located,
   wherein the controller is configured to assign, based on the number of the detected one or more lanes and the length of the detected lane, the weights to the detected one or more lanes and the trajectory of vehicle movement,
   wherein the controller is configured to, based on the number of the detected one or more lanes and the length of the detected lane being increased, (i) increase the weight assigned to the detected one or more lanes and (ii) decrease the weight assigned to the trajectory of vehicle movement, and
   wherein the controller is configured to, based on the number of the detected one or more lanes and the length of the detected lane being decreased, (i) decrease the weight assigned to the detected one or more lanes and (ii) increase the weight assigned to the trajectory of vehicle movement.

2. The display device of claim 1,
   wherein the display unit comprises a Head-Up Display (HUD) configured to display the virtual road image by projecting the virtual road image onto a windshield of the vehicle, and
   wherein the controller is configured to control the HUD to display the virtual road image on a region of the windshield, the windshield through which the road is seen.

3. The display device of claim 1,
   wherein the display unit is configured to display the received image of the road on a screen, and
   wherein the controller is configured to control the display unit to display the virtual road image on a region corresponding to the road within the displayed image of the road.

4. The display device of claim 1, wherein the controller is configured to display the virtual road image with reference to a position of the vehicle within the road.

5. The display device of claim 1, wherein the controller is configured to:
   receive a driving speed of the vehicle and information related to a destination route, and
   control information indicating the driving speed and the destination route to be displayed within the virtual road image based on the received information related to the destination route.

6. The display device of claim 1,
   wherein the controller is configured to receive information related to a destination route of the vehicle, and
   wherein the controller is configured to control, based on a turn point existing within a preset distance from a location of the vehicle according to the received information, the display unit to stop displaying the virtual road image and to display an item indicating an exit direction of the turn point.

7. The display device of claim 6, wherein the controller is configured to control, based on the turn point existing and a different vehicle located in the preset distance within the road being detected, the display unit to stop displaying the virtual road image and to display the item.

8. The display device of claim 6, wherein the controller is configured to control, based on the turn point existing and an object equal to or greater than a preset area existing in a region on which the virtual road image is displayed, the display unit to stop displaying the virtual road image and to display the item.

9. The display device of claim 1, wherein the controller is configure to control, based on either a left lane or a right lane being detected as a lane on which the vehicle is located, the display unit to display the virtual road image based on the detected left or right lane and a width of a previously driven road.

10. The display device of claim 1, wherein the controller is configured to, based on the virtual road image being moved from a first position to a second position, divide a distance from the first position to the second position into a plurality of sections and control the virtual road image to sequentially move through the plurality of the sections.

11. The display device of claim 1, wherein the controller is configured to, based on the number of the detected one or more lanes being increased, increase the weight assigned to the detected one or more lanes and decrease the weight assigned to the trajectory of vehicle movement, and
wherein the controller is configured to, based on the number of the detected one or more lanes being decreased, decrease the weight assigned to the detected one or more lanes and increase the weight assigned to the trajectory of vehicle movement.

12. The display device of claim 1, wherein the controller is configured to adjust a width of the virtual road image based on at least one of the number of the detected one or more lanes, a quality of each of the detected one or more lanes, or a driving speed of the vehicle.

13. A method of controlling a display device disposed at a vehicle, the method comprising:
receiving an image of a road in which the vehicle is located and trajectory information providing a trajectory of vehicle movement;
detecting one or more lanes of the road based on the received image of the road;
assigning weights to (i) the detected one or more lanes and (ii) the trajectory of vehicle movement, respectively, based on a preset reference value;
generating a virtual road image providing a direction based on the assigned weights; and
displaying the generated virtual road image,
wherein the preset reference value comprises a number of the detected one or more lanes,
wherein assigning the weights to the detected one or more lanes and the trajectory of vehicle movement comprises assigning the weights to the detected one or more lanes and the trajectory of vehicle movement based on the number of the detected one or more lanes,
wherein the preset reference value further comprises a length of the detected lane in which the vehicle is located,
wherein assigning the weights to the detected one or more lanes and the trajectory of vehicle movement comprises assigning the weights to the detected one or more lanes and the trajectory of vehicle movement based on the number of the detected one or more lanes and the length of the detected lane, and
wherein assigning the weights to the detected one or more lanes and the trajectory of vehicle movement comprises:
based on the number of the detected one or more lanes and the length of the detected lane being increased, increasing the weight assigned to the detected one or more lanes and decreasing the weight assigned to the trajectory of vehicle movement, and
based on the number of the detected one or more lanes and the length of the detected lane being decreased, decreasing the weight assigned to the detected one or more lanes and increasing the weight assigned to the trajectory of vehicle movement.

14. The method of claim 13, wherein assigning the weights to the detected one or more lanes and the trajectory of vehicle movement comprises:
based on the number of the detected one or more lanes being increased, increasing the weight assigned to the detected one or more lanes and decreasing the weight assigned to the trajectory of vehicle movement, and
based on the number of the detected one or more lanes being decreased, decreasing the weight assigned to the detected one or more lanes and increasing the weight assigned to the trajectory of vehicle movement.

* * * * *